US012236610B2

(12) United States Patent
Price et al.

(10) Patent No.: US 12,236,610 B2
(45) Date of Patent: Feb. 25, 2025

(54) GENERATING IMPROVED ALPHA MATTES FOR DIGITAL IMAGES BASED ON PIXEL CLASSIFICATION PROBABILITIES ACROSS ALPHA-RANGE CLASSIFICATIONS

(71) Applicant: Adobe Inc., San Jose, CA (US)

(72) Inventors: Brian Price, San Jose, CA (US); Yutong Dai, Adelaide (AU); He Zhang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 404 days.

(21) Appl. No.: 17/500,736

(22) Filed: Oct. 13, 2021

(65) Prior Publication Data

US 2023/0112186 A1  Apr. 13, 2023

(51) Int. Cl.
*G06T 7/194* (2017.01)
*G06T 5/50* (2006.01)
*G06T 5/94* (2024.01)
*G06T 7/11* (2017.01)

(52) U.S. Cl.
CPC .............. *G06T 7/194* (2017.01); *G06T 5/50* (2013.01); *G06T 5/94* (2024.01); *G06T 7/11* (2017.01); *G06T 2207/20076* (2013.01); *G06T 2207/20084* (2013.01)

(58) Field of Classification Search
CPC .......... G06T 7/194; G06T 5/008; G06T 5/50; G06T 7/11; G06T 2207/20076; G06T 2207/20084
See application file for complete search history.

(56) References Cited

U.S. PATENT DOCUMENTS

| | | | |
|---|---|---|---|
| 2020/0302656 A1* | 9/2020 | Kumar | G06F 3/04845 |
| 2023/0014448 A1* | 1/2023 | Gonzalez Morin | G06V 10/764 |
| 2023/0112186 A1* | 4/2023 | Price | G06T 7/194 |
| | | | 382/173 |

OTHER PUBLICATIONS

PointRend: Image Segmentation as Rendering by A. Kirillov et al., found at arXiv:1912.08193, 2020.
Xu, N., Price, B., Cohen, S. and Huang, T., 2017. Deep image matting. In Proceedings of the IEEE conference on computer vision and pattern recognition (pp. 2970-2979).
Hou, Q. and Liu, F., 2019. Context-aware image matting for simultaneous foreground and alpha estimation. In Proceedings of the IEEE/CVF International Conference on Computer Vision (pp. 4130-4139).

(Continued)

*Primary Examiner* — Umair Ahsan
(74) *Attorney, Agent, or Firm* — Keller Preece PLLC

(57) ABSTRACT

This disclosure describes one or more implementations of an alpha matting system that utilizes a deep learning model to generate alpha mattes for digital images utilizing an alpha-range classifier function. More specifically, in various implementations, the alpha matting system builds and utilizes an object mask neural network having a decoder that includes an alpha-range classifier to determine classification probabilities for pixels of a digital image with respect to multiple alpha-range classifications. In addition, the alpha matting system can utilize a refinement model to generate the alpha matte from the pixel classification probabilities with respect to the multiple alpha-range classifications.

20 Claims, 11 Drawing Sheets

(56) References Cited

OTHER PUBLICATIONS

Lu, H., Dai, Y., Shen, C. and Xu, S., 2019. Indices matter: Learning to index for deep image matting. In Proceedings of the IEEE/CVF International Conference on Computer Vision (pp. 3266-3275).

Li, Y. and Lu, H., Apr. 2020, Natural image matting via guided contextual attention. In Proceedings of the AAAI Conference on Artificial Intelligence (vol. 34, No. 07, p. 11450-11457).

Shen, X., Tao, X., Gao, H., Zhou, C. and Jia, J., Oct. 2016, Deep automatic portrait matting. In European conference on computer vision (pp. 92-107). Springer, Cham.

Chen, Q., Ge, T., Xu, Y., Zhang, Z., Yang, X. and Gai, K., Oct. 2018, Semantic human matting. In Proceedings of the 26th ACM international conference on Multimedia (pp. 618-626).

Sengupta, S., Jayaram, V., Curless, B., Seitz, S.M. and Kemelmacher-Shlizerman, I., 2020. Background matting: The world is your green screen. In Proceedings of the IEEE/CVF Conference on Computer Vision and Pattern Recognition (pp. 2291-2300). Part 1.

Sengupta, S., Jayaram, V., Curless, B., Seitz, S.M. and Kemelmacher-Shlizerman, I., 2020. Background matting: The world is your green screen. In Proceedings of the IEEE/CVF Conference on Computer Vision and Pattern Recognition (pp. 2291-2300). Part 2.

* cited by examiner

GENERATING IMPROVED ALPHA MATTES FOR DIGITAL IMAGES BASED ON PIXEL CLASSIFICATION PROBABILITIES ACROSS ALPHA-RANGE CLASSIFICATIONS

BACKGROUND

Recent years have seen significant improvements in hardware and software platforms for training and utilizing machine-learning models. For instance, several machine-learning methods have achieved promising performance in areas such as image editing. In particular, recent developments have been made with respect to object segmentation for extracting foreground objects in digital images and videos. Notwithstanding these improvements, current systems continue to suffer from several problems with regard to the accuracy and flexibility of computing device operations, and in particular, with respect to image matting methods. As one example, while current image matting systems can largely identify foreground objects in digital images, they struggle to precisely and accurately separate foreground objects from backgrounds in various circumstances (e.g., due to object textures, lighting, blur, or frequency). Indeed, many current image matting systems rigidly employ image methods that generate inaccurate image segments of objects in digital images. These along with additional problems and issues exist in current systems that generate digital images based on image matting.

BRIEF SUMMARY

Implementations of the present disclosure provide benefits and/or solve one or more of the foregoing or other problems in the art with systems, non-transitory computer-readable media, and methods that accurately, flexibly, and efficiently generate alpha mattes for digital images utilizing deep learning methods that determine pixel classification probabilities for multiple alpha-range classifications. More specifically, in various implementations, the disclosed systems build an object mask neural network that encodes a digital image into a feature map. In addition, the object mask neural network includes a decoder with an alpha-range classifier function that determines classification probabilities for pixels of the digital image across multiple alpha-range classifications. In various implementations, the disclosed systems generate an accurate alpha matte of the digital image utilizing one or more refinement models and the pixel classification probabilities for the multiple alpha-range classifications. Further, in some implementations, the disclosed systems utilize the alpha matte to correctly segment a foreground object portrayed in the digital image.

The following description sets forth additional features and advantages of one or more implementations of the disclosed systems, computer-readable media, and methods.

BRIEF DESCRIPTION OF THE DRAWINGS

The detailed description provides one or more implementations with additional specificity and detail through the use of the accompanying drawings, as briefly described below.

DETAILED DESCRIPTION

Figure 1:
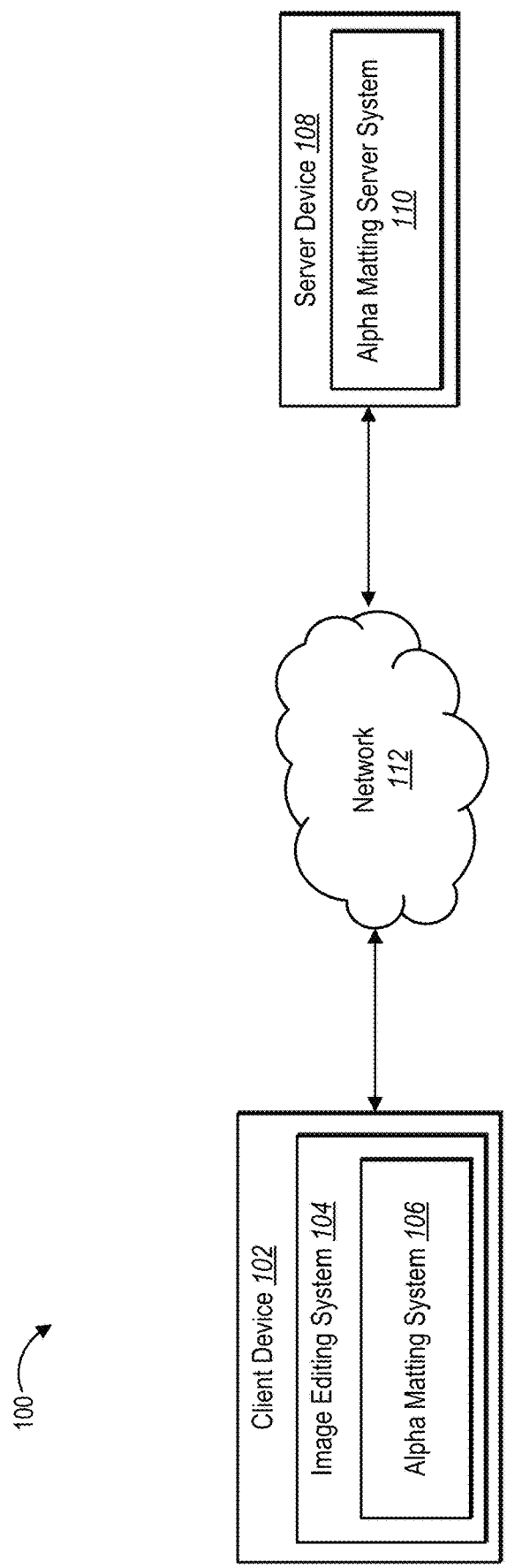
FIG. 1 illustrates a schematic diagram of a system environment in which an alpha matting system operates in accordance with one or more implementations.

This disclosure describes one or more implementations of an alpha matting system that utilizes a deep learning model to generate alpha mattes for digital images utilizing an alpha-range classifier function. For example, in various implementations, the alpha matting system builds and utilizes an object mask neural network that includes an alpha-range classifier function to determine classification probabilities for pixels of a digital image with respect to multiple alpha-range classifications. To illustrate, in one or more implementations, the alpha matting system determines an alpha matte for a digital image utilizing the object mask neural network by generating a feature map from the digital image. Based on the feature map, the alpha matting system utilizes an alpha-range classifier function in a decoder of the object mask neural network to determine classification probabilities for pixels of a digital image for several alpha-range classifications. In addition, the alpha matting system generates the alpha matte, which includes alpha values for the pixels determined from the classification probabilities for the pixels of the digital image with respect to the several alpha-range classifications. By utilizing the alpha-range classifier function and/or pixel classification probabilities for the multiple alpha-range classifications, the alpha matting system can generate improved alpha mattes for foreground objects within digital images.

As mentioned above, in various implementations, the alpha matting system builds and utilizes an object mask neural network to determine alpha values and an alpha matte for digital images. In various implementations, the object mask neural network includes an encoder and decoder. For example, the encoder generates a feature map of the digital image that encodes visual features of the digital image into a latent vector. Further, in some implementations, the encoder generates a feature map from the digital image and a trimap of the digital image.

In one or more implementations, the decoder includes fully connected layers and an alpha-range classifier function. For example, the decoder includes multiple channels corresponding to a number of alpha-range classifications. The alpha matting system utilizes the alpha-range classifier function to determine classification probabilities for pixels of a digital image from the feature map. To illustrate, the alpha matting system utilizes the alpha-range classifier function to determine a classification probability per pixel for each of the alpha-range classifications (e.g., a SoftMax function).

As mentioned above, in some implementations, the decoder includes a number of channels corresponding to the alpha-range classifications. For instance, in one or more implementations, the alpha matting system discretizes alpha values from a single range (e.g., 0-255 or 0-100) to multiple smaller ranges of alpha values. For instance, in some implementations, the alpha matting system discretizes the alpha values into eleven alpha-range classifications (e.g., 0-24, 25-50, . . . , 229-255). In these implementations, the alpha matting system determines the probability that a pixel has an alpha value matching the alpha value range of each classification.

In one or more implementations, upon determining classification probabilities for pixels of the digital image for the alpha-range classifications, the alpha matting system generates alpha values for each pixel. In some implementations, the alpha matting system utilizes a refinement model. For example, the alpha matting system utilizes one or more algorithmic functions to generate alpha values for pixels from corresponding classification probabilities for the alpha-range classifications. As another example, the alpha matting system utilizes one or more machine-learning-based functions and/or one or more optimization-based functions to generate the alpha values for the pixels.

Additionally, in some implementations, the alpha matting system iteratively utilizes the object mask neural network to determine alpha values for the pixels. To illustrate, in some implementations, the alpha matting system utilizes the object mask neural network to generate a feature map from an initial trimap of the digital image as well as determine pixel classification probabilities for alpha-range classifications from the feature map. Then, the alpha matting system generates a refined trimap based on the pixel classification probabilities for the alpha-range classifications and provides the refined trimap back to the object mask neural network. Further, the alpha matting system utilizes the object mask neural network and the refined trimap to determine one or more additional classification probabilities for pixels of the digital image, and in turn, accurate pixel values that make up the alpha matte.

As mentioned above, in one or more implementations, the alpha matting system builds the object mask neural network. In some implementations, the alpha matting system trains the object mask neural network and its components based on one or more loss models. For example, the alpha matting system utilizes cross-entropy loss to build the object mask neural network based on comparing alpha mattes predicted by the object mask neural network with corresponding ground truth alpha values.

In various implementations, the alpha matting system utilizes multiple focal loss functions to train the object mask neural network. For example, the alpha matting system comparing classification probabilities of pixels in unknown regions for the alpha-range classifications to ground-truth values for corresponding pixels utilizing a first focal loss. Additionally, the alpha matting system compares the plurality of classification probabilities of pixels across the whole image (e.g., in the foreground regions, background regions, and unknown regions for the alpha-range classifications) to the ground-truth values for corresponding pixels utilizing a second focal loss. Further, in certain implementations, based on the first focal loss and the second focal loss, the alpha matting system learns weights and parameters of the object mask neural network.

As mentioned above, conventional image matting systems suffer from a number of problems with regard to the accuracy and flexibility of computing device operations. To illustrate, regarding accuracy, many conventional systems provide inaccurate image segmentations due to unclear and imprecise alpha mattes. More specifically, many conventional systems struggle to accurately separate foreground objects from backgrounds in various circumstances. For example, many conventional systems struggle to accurately determine alpha values for certain textures or materials, such as hair and transparent glass. As another example, many conventional systems struggle to accurately determine alpha values with certain lighting configurations, such as backlighting or lighting from multiple sources. Additionally, many conventional systems struggle with segmenting blurred objects or separating high-frequency foreground objects from lower-frequency backgrounds of a digital image.

A primary cause of alpha matte inaccuracies results from conventional systems employing a regression function to determine alpha values for pixels in a digital image. For instance, a regression-based network determines a single alpha value from 0-255 (or 0-100 when normalized) for each pixel of a digital image. Often, when a pixel has a partial transparency value, conventional systems determine the incorrect alpha value for the pixel, which can affect the accuracy of neighboring pixels as well as result in an inaccurate alpha matte.

As mentioned above, many conventional systems are also inflexible. In many instances, the inaccuracy of conventional systems is tied to the rigidity of these systems. To illustrate, conventional systems that employ regression functions are limited in the type of training functions that can be used to train the network. For example, many conventional systems cannot enforce various loss functions on the whole digital image or multiple regions of the digital image because enforcing these loss functions would cause unwanted bias and poor results. However, not being able to utilize these loss functions also leads to poorer quality training and unsatisfactory results.

In addition, conventional systems that employ regression functions are also limited in identifying why a conventional system is struggling with segmenting a given object. Indeed, because regression functions output single alpha values for pixels, these conventional systems provide no information regarding the confidence of each pixel determination. Accordingly, this inflexibility limits the ability to pinpoint less confident areas and/or difficult regions in an image that causes alpha matte inaccuracies.

In contrast, the alpha matting system can provide numerous advantages and benefits over conventional systems. As described below, in many implementations, the alpha matting system improves accuracy relative to conventional systems. To illustrate, the alpha matting system utilizes multiple classification probabilities to determine alpha values for pixels of a digital image. For example, the alpha matting system generates and utilizes an object mask neural network that includes an alpha-range classifier function that determines classification probabilities for a pixel of a digital image across multiple alpha-range classifications. In this manner, the alpha matting system can provide alpha value confidence levels across multiple ranges (i.e., alpha-range classifications) of potential alpha values rather than providing a single alpha value for a pixel. Indeed, the alpha matting system 106 can generate smoother and more accurate alpha mattes as well as identify problem areas in digital images based on these alpha value confidence levels, as described below.

To elaborate, in one or more implementations, the alpha matting system improves accuracy over conventional systems by generating alpha mattes that more realistically segment foreground objects from digital image backgrounds. Indeed, by utilizing the classification probabilities for pixels across the alpha-range classifications, the alpha matting system is able to more accurately generate alpha values for the pixels by implicitly balancing data introduced from a classification-based model. Additionally, as provided below, various refinement models can utilize the pixel classification probabilities for the alpha-range classifications to determine alpha values that are more precise than conventional systems.

Furthermore, the alpha matting system outperforms conventional systems with respect to qualitative and quantitative results. To elaborate, researchers performed various evaluations comparing implementations of the alpha matting system described herein with state-of-the-art systems. As shown below in Tables 1 and 3, the implementations of the alpha matting system outperformed these current systems. Further, FIG. 6, which is described below, provides qualitative results of the implementations of the alpha matting system outperforming a conventional system.

Additionally, utilizing an alpha-range classifier function allows the alpha matting system to flexibly train a corresponding object mask neural network. To illustrate, in one or more implementations, utilizing alpha-range classifications instead of single, fixed alpha values, the alpha matting system is able to ease the difficulty of predicting precise values as well as focus more attention on difficult areas. This, in turn, causes the alpha matting system to generate more accurate results in difficult image areas (e.g., areas that include complex textures, lighting, blur, or frequency).

As another advantage, in various implementations, the alpha matting system utilizes loss functions that are not enforceable by conventional systems. For example, because classification probabilities for alpha-range classifications are not restricted to single values, the alpha matting system is able to use various loss functions that are otherwise unusable by conventional systems. In particular, the alpha matting system can utilize a first focal loss focused on uncertain regions of a digital image and utilize a second focal loss across an entire digital image. As a result, the alpha matting system can further improve training on the object mask neural network that includes the alpha-range classifier function.

Moreover, when a problem area is encountered with respect to generating an alpha matte, the alpha matting system is able to utilize the classification probabilities for the alpha-range classifications to indicate where shortcomings are occurring. Indeed, the alpha matting system provides a way to identify areas that are struggling with respect to generating an alpha matte as well as several ways to handle or refine those regions, as further described below.

As illustrated by the foregoing discussion, the present disclosure utilizes a variety of terms to describe the features and advantages of the semantic layout system. To illustrate, the term "digital image" (or simply "image") refers to a digital visual representation (e.g., a digital graphics file that when rendered displays one or more objects or scenes). In various implementations, images are made up of pixels of features that group together to form a visual representation. In various implementations, an image editing system displays an image on a computing device, such as a client device.

The term "trimap" refers to a partition of a digital image (or portion of an image) into multiple regions. For instance, a trimap is a rough segmentation of a digital image that partitions a digital image into a foreground region that includes pixels in the foreground, a background region that includes pixels in the background, and an unknown region that includes pixels that are a blend of foreground and background pixels. In some implementations, the trimap includes white for foreground pixels, black for background pixels, and gray for pixels in the unknown region.

As mentioned above, in various implementations, the alpha matting system generates an alpha matte by determining alpha values for pixels of a digital image when segmenting an object from the digital image. As used herein, the term "alpha matte" refers to a digital image layer of a digital image that includes transparency information for the digital image. In some instances, an alpha matte is included as part of a channel within the layers. For example, a layer of a digital image includes red, green, blue, and alpha channels (e.g., RGBA). Additionally, the alpha matte indicates transparency information of the layer (or an overlapping layer). For instance, for each pixel location within a layer of a digital image, the color channels combine to display a color and the alpha matte pixel indicates the transparency level (e.g., alpha value) of the displayed color.

Similarly, the term "alpha value" refers to a number corresponding to the transparency of a pixel in a digital image. For instance, in some implementations, an alpha value has a transparency value ranging from 0 to 255, where an alpha value of 0 indicates full opacity, an alpha value of 255 indicates full transparency, and intermediate alpha values correspond to a transparency magnitude. In one or more implementations, an alpha value has a transparency value ranging from 0 to 1 (or 0-100%), where an alpha value of 0 indicates full opacity and an alpha value of 100 indicates full transparency (or vice versa).

As mentioned previously, the alpha matting system trains and utilizes an object mask neural network in various implementations. As used herein, the term "neural network" refers to a machine learning model that can be trained and/or tuned based on inputs to determine classifications or approximate unknown functions. For example, a neural network includes a model of interconnected artificial neurons (e.g., organized in layers) that communicate and learn parameters to approximate complex functions and generate outputs based on inputs provided to the neural network. In some cases, a neural network refers to an algorithm (or set of algorithms) that implements deep learning techniques to model high-level abstractions in data. For example, a neural network can include an object detection neural network, an object mask neural network, a trimap generation neural network, a convolutional neural network (CNN), residual neural network, recurrent neural network (RNN) such as LSTMs, generative adversarial neural network (GAN), single-shot detection (SSD) networks, and/or a combination of multiple neural network types.

Along these lines, a neural network often includes an encoder and a decoder. For example, an encoder refers to a neural network layer that generates a feature map (e.g., a latent vector) by extracting or encoding features from a digital image (or a portion of a digital image). For example, an encoder analyzes or processes a digital image and/or a trimap of a digital image to extract numerical or mathematical representations of pixel transparencies.

Relatedly, the term decoder refers to a neural network layer that generates parameters from a feature map including one or more extracted or encoded features. For example, a decoder includes layers or neurons to decode extracted features into alpha values for generating an alpha matte. In various implementations, the decoder includes an alpha-range classifier function that classifies pixels across multiple alpha-range classifications. For example, the decoder includes multiple channels corresponding to a number of alpha-range classifications. In this manner, the alpha matting system utilizes the alpha-range classifier function in the decoder to determine classification probabilities for pixels of a digital image from the feature map.

As used herein, the terms "loss function" or "loss model" refer to a function that indicates error amounts (e.g., measures of loss). As mentioned above, in some embodiments, a machine-learning algorithm repetitively trains to reduce overall loss (and increase loss in some cases). In various implementations, training includes comparing predictive outputs of the object mask neural network (e.g., classification probabilities for the alpha-range classifications and/or an alpha matte) to corresponding ground truth values. In some embodiments, the semantic layout system employs multiple loss functions and reduces overall loss between multiple networks and models. Examples of loss functions include cross-entropy loss and focal loss (both for unknown regions as well as additional regions).

As mentioned above, the alpha matting system determines classification probabilities for pixels of a digital image for the alpha-range classifications. The term "alpha-range classifications" refers to classification classes, sets, groups, ranges, and/or subsets corresponding to alpha values. For instance, an alpha-range classification is a discretization of alpha values from a single range of 0-255 to multiple smaller ranges of alpha values for pixels. In some implementations, the number of alpha-range classifications corresponds to the number of channels in the decoder. For example, the decoder can include between 11 and 51 channels and/or alpha-range classifications (or a variety of other ranges, e.g., between 5 and 60, 10 to 55, or 15 to 45 channels and alpha-range classifications). Relatedly, the term "classification probability" refers to the probability, likelihood, or percentage that a pixel has an alpha value that falls within the alpha range values of an alpha-range classification.

As used herein, the term "refinement model" refers to a model, algorithm, or method that generates an alpha matte from pixel classification probabilities for alpha-range classifications. In some instances, a refinement model converts the pixel classification probabilities for a pixel into an alpha value. Upon determining multiple alpha values, the refinement model can generate an alpha matte for a digital image. As described in detail below, refinement models may include algorithmic functions, optimization-based functions, and machine-learning-based functions. Additionally, the refinement model may include iteratively utilizing the object mask neural network to further refined alpha values for pixels of a digital image.

Additional detail regarding the alpha matting system will now be provided with reference to the figures. For example, FIG. 1 illustrates a schematic diagram of a digital medium system environment 100 in which an alpha matting system 106 operates in accordance with one or more implementations. As shown in FIG. 1, the digital medium system environment 100 ("environment 100") includes a client device 102 and a server device 108 connected via a network 112. Additional detail regarding these computing devices is provided below in connection with FIG. 9. In addition, FIG. 9 also provides additional detail regarding networks such as the network 112 shown in FIG. 1.

As shown, the environment 100 includes the client device 102, which includes an image editing system 104 and an alpha matting system 106. In various implementations, the client device 102 is associated with a user (e.g., a user client device). For example, the client device 102 detects input from a user requesting that the alpha matting system segments and/or generates an alpha matte for an object in a digital image.

In various implementations, the image editing system 104 implements some or all of the alpha matting system 106. In alternative implementations, the alpha matting system 106 is separate from the image editing system 104. While the image editing system 104 and the alpha matting system 106 are shown on the client device 102, in some implementations, the image editing system 104 and/or the alpha matting system 106 are located remotely (fully or in part) from the client device 102 (e.g., on the server device 108), as further explained below.

The image editing system 104, in general, facilitates the creation, modification, sharing, searching, and/or deletion of digital images. For instance, the image editing system 104 provides a variety of tools related to image creation and editing (e.g., photo editing). For example, the image editing system 104 provides selection tools and image manipulation tools. Moreover, the image editing system 104 optionally operates in connection with one or more applications to generate or modify digital images including images segmented utilizing an alpha matte. In some instances, the image editing system 104 operates in connection with digital design applications or other image editing applications. For example, the image editing system 104 can crop an object portrayed in a digital image and move the object to another digital image (e.g., with a new background).

As mentioned above, the image editing system 104 includes the alpha matting system 106. As further provided below, the alpha matting system 106 utilizes machine-learning models (e.g., neural networks) to generate alpha mattes for digital images. In particular, the alpha matting system 106 builds an object mask neural network having an alpha-range classifier function that determines multiple classification probabilities for pixels of a digital image for alpha-range classifications. As described below, in many implementations, the alpha matting system 106 utilizes the pixel classification probabilities to generate accurate alpha values, which combine to create an alpha matte for a digital image.

The alpha matting system 106 can also utilize the alpha matte to generate enhanced digital images. For example, the alpha matting system 106 can segment an object portrayed in a digital image and provide the segmented object for display via the client device 102. Similarly, the alpha matting system 106 can cut, crop, paste, move, replace, fill, and/or modify a segmented object from a digital image. For instance, the alpha matting system 106 can segment an object portrayed in a digital image, replace the background of the digital image, and generate an enhanced digital image with the new background (e.g., by merging the new background with the segmented object utilizing the alpha values of the alpha matte).

As shown, the environment 100 also includes the server device 108. The server device 108 includes an alpha matting server system 110. For example, in one or more implementations, the alpha matting server system 110 represents and/or provides similar functionality as described herein in connection with the alpha matting system 106. In some implementations, the alpha matting server system 110 supports the alpha matting system 106 on the client device 102.

In one or more implementations, the server device 108 includes all, or a portion of, the alpha matting system 106. For instance, the alpha matting server system 110 learns parameters for the object mask neural network and/or portions thereof. The alpha matting server system 110 then provides the object mask neural network with the learned parameters to the client device 102 (e.g., as part of an image editing application). In these instances, the client device 102 (e.g., the alpha matting system 106) downloads the object mask neural network with the learned parameters from the server device 108 (e.g., the alpha matting server system 110).

In some implementations, the alpha matting server system 110 includes a web hosting application that allows the client device 102 to interact with content and services hosted on the server device 108. To illustrate, in one or more implementations, the client device 102 accesses a web page supported by the server device 108. For example, the client device 102 provides one or more images to the server device 108, and, in response, the alpha matting server system 110 on the server device 108 generates an alpha matte for one or more foreground objects in the digital image. The server device 108 then provides the alpha matte and/or segmentation of an object portrayed in the digital image utilizing the alpha matte for display via the client device 102.

Although FIG. 1 illustrates a particular number, type, and arrangement of components within the environment 100, various additional environment configurations and arrangements are possible. For example, the environment 100 includes any number of client devices. As another example, the server device 108 represents a set of connected server devices. As a further example, the client device 102 may communicate directly with the server device 108, bypassing the network 112 or utilizing a separate and/or an additional network.

Figure 2:
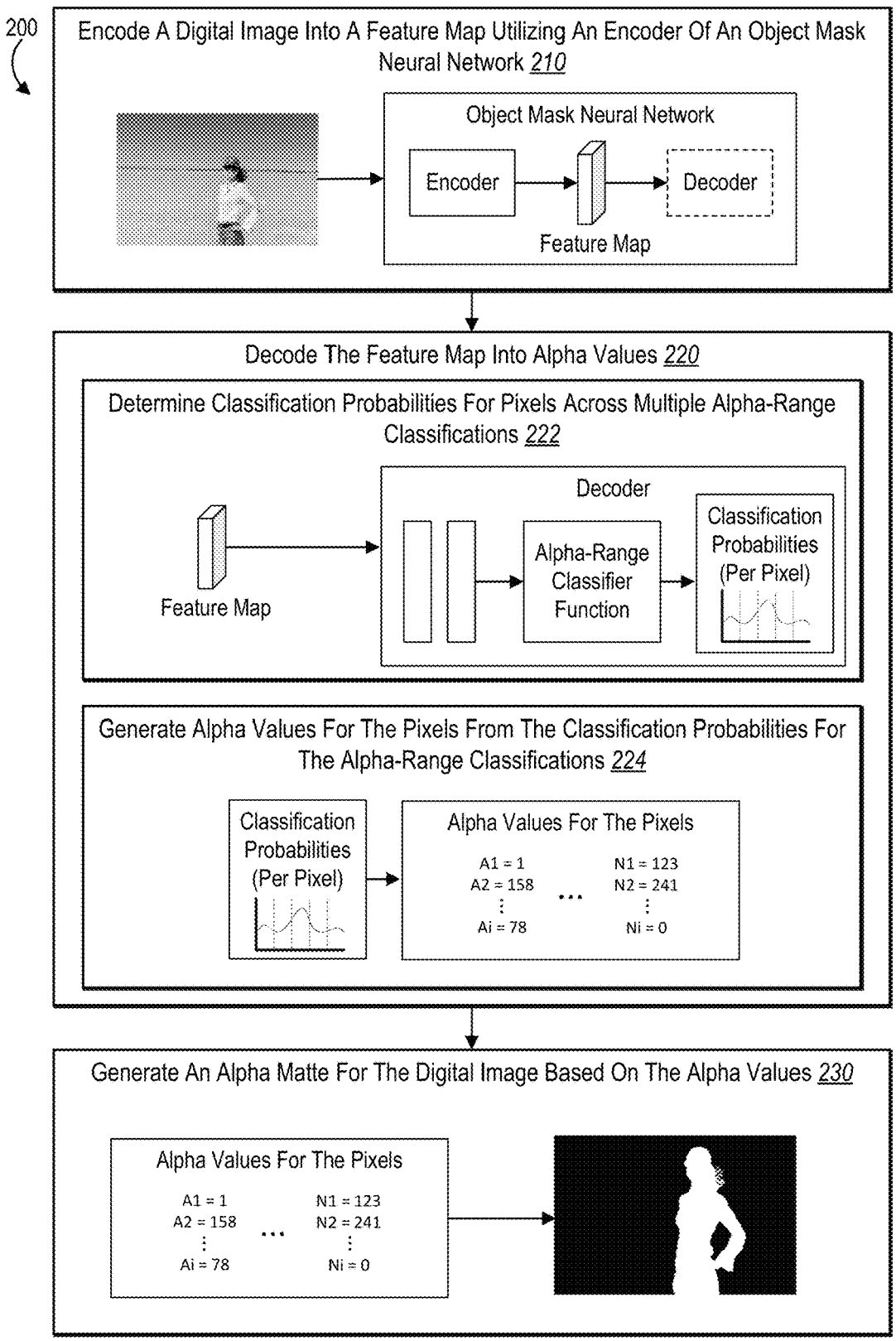
FIG. 2 illustrates an overview flow and block diagram of utilizing an object mask neural network to determine pixel classification probabilities for a digital image across a plurality of alpha-range classifications in accordance with one or more implementations.

As indicated above, FIG. 2 illustrates generating an object mask neural network that determines pixel classification probabilities for a digital image across a plurality of alpha-range classifications in accordance with one or more implementations. In particular, FIG. 2 includes a series of acts 200 performed by alpha matting system 106 (or the image editing system 104 in some cases) to determine pixel classification probabilities for a plurality of alpha-range classifications.

To illustrate, FIG. 2 includes the alpha matting system 106 performing an act 210 of encoding a digital image into a feature map utilizing an encoder of an object mask neural network. For example, in one or more implementations, the alpha matting system 106 receives a digital image that portrays an object. Utilizing the object mask neural network, the alpha matting system 106 encodes the digital image into a feature map that provides a latent representation of pixels within the digital image. In some implementations, as described below, the alpha matting system 106 generates and/or receives a trimap of the digital image and encodes the trimap, along with the digital image, into the feature map. Additional detail regarding trimaps and generating feature maps from digital images is provided below with respect to FIGS. 3 and 4A-4B.

As shown in FIG. 2, the alpha matting system 106 also performs an act 220 of decoding the feature map into alpha values. In various implementations, the object mask neural network includes a decoder having an alpha-range classifier function. For example, the decoder includes a multi-channel output where the number of channels corresponds to a number of alpha-range classifications used to classify pixels of a digital image.

As shown, the act 220 includes additional sub-acts. For instance, the act 220 includes a sub-act 222 of the alpha matting system 106 determining classification probabilities for pixels across multiple alpha-range classifications. For example, in various implementations, the alpha matting system 106 utilizes the alpha-range classifier function to determine, for each pixel of the digital image being processed, a classification probability for each of the alpha-range classifications.

In this manner, the alpha matting system 106 may use the alpha-range classifier function to generate a confidence map (or probability distribution) for each of the pixels that indicates the probability that the pixel has a given alpha value within a range of alpha values (i.e., the alpha-range classifications). To illustrate, the sub-act 222 shows the alpha-range classifier function generating classification probabilities (e.g., a confidence map or a probability map) for a pixel from the feature map of the digital image. Additional detail regarding generating pixel classification probabilities for alpha-range classifications is provided below with respect to FIGS. 3 and 4A-4C.

As also shown, the act 220 includes a sub-act 224 of the alpha matting system 106 generating alpha values for the pixels of the digital image from the classification probabilities for the alpha-range classifications. For instance, in various implementations, the alpha matting system 106 determines an alpha value for each of the pixels based on the classification probabilities for the pixel. In some implementations, the alpha matting system 106 utilizes a refinement model to refine the classification probabilities for a pixel into an alpha value, such as an algorithmic function, a machine-learning-based function, an optimization function. In certain implementations, the alpha matting system 106 utilizes the object mask neural network to further refine the classification probabilities for pixels as part of determining alpha values. Additional detail regarding refinement models and generating alpha values from pixel classification probabilities is provided below with respect to FIGS. 4A-4C and 5.

FIG. 2 also shows that the series of acts 200 includes an act 230 of the alpha matting system 106 generating an alpha matte for the digital image based on the alpha values. For example, in various implementations, the alpha matting system 106 generates an alpha matte for the digital image by mapping the alpha values to the corresponding coordinates in an image layer (or channel) of the digital image. Further, in various implementations, the alpha matting system 106 provides a segmentation of an object portrayed in the digital image utilizing the alpha matte. Additional detail regarding generating an alpha matte from alpha values is provided below with respect to FIGS. 4A, 4B, 5, and 6.

Figure 3:
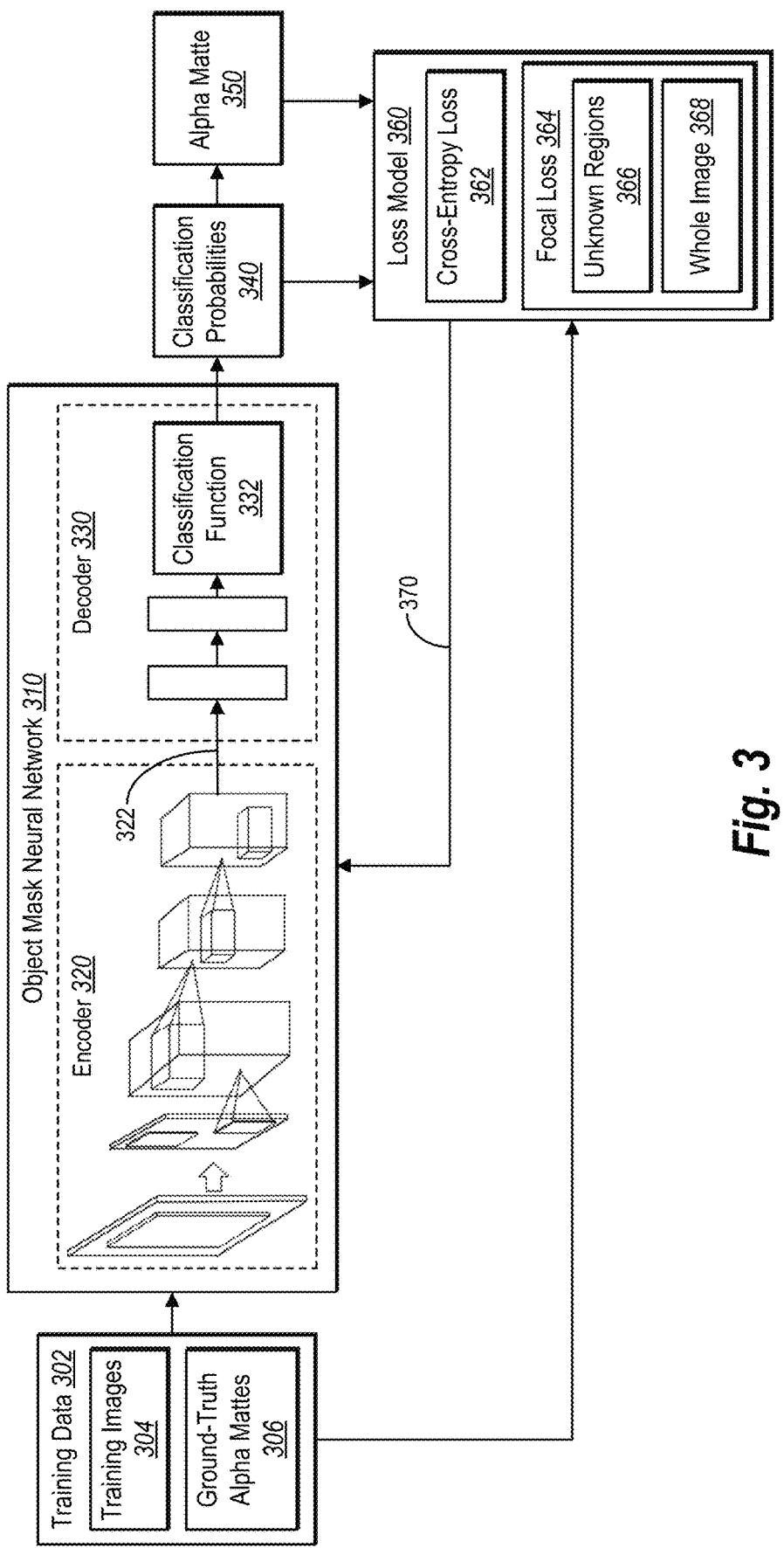
FIG. 3 illustrates a block diagram of generating an object mask neural network to determine alpha mattes for digital images in accordance with one or more implementations.

Turning now to FIG. 3, additional detail is provided regarding generating, building, and training an object mask neural network. For example, FIG. 3 shows the architecture and training of an object mask neural network 310. In particular, FIG. 3 illustrates a block diagram of generating an object mask neural network to determine alpha mattes for digital images in accordance with one or more implementations.

Specifically, FIG. 3 illustrates training data 302, an object mask neural network 310, and a loss model 360. As shown, the training data 302 includes the training images 304 and ground-truth alpha mattes 306 corresponding to the training data 302. In some implementations, the training data 302 includes at least one foreground object and the ground-truth alpha mattes 306 include alpha values (e.g., transparency values) for segmenting the foreground object in the training data 302. In one or more embodiments, the training images 304 also include input trimaps (e.g., initial estimates of foreground, background, and unknown regions of the digital image).

As shown, the object mask neural network 310 includes multiple neural network layers. For instance, the object mask neural network 310 includes an encoder 320 and a decoder 330. In various implementations, the object mask neural network 310 has a backbone corresponding to a ResNet 34 encoder-decoder architecture. For example, in one or more implementations, the decoder 330 includes residual blocks and upsampling layers. In addition, in some implementations, various features from the encoder 320 are skipped and added to the decoder 330 layer-by-layer. The alpha matting system 106 can utilize a variety of encoding/decoding architectures to generate encodings from the training data 302 and generate an alpha matte.

In various implementations, the encoder 320 encodes visual features of digital images (e.g., the training images 304) into feature maps 322 (e.g., latent feature vectors). For example, the encoder 320 includes various lower neural network layers for encoding digital images. In some implementations, as described below, the encoder 320 may generate a feature map 322 from a digital image and/or a trimap corresponding to a digital image. Further, the encoder 320 may provide the feature map 322 to the decoder 330. As noted above, in one or more implementations, the encoder 320 provides the feature map 322 from neural network layers of the encoder 320 to corresponding neural network layers of the decoder 330.

In one or more implementations, the decoder 330 includes higher neural network layers, such as fully-connected layers, as well as an alpha-range classifier function 332. As mentioned previously, in some implementations, the decoder 330 includes a multi-channel output followed by a SoftMax operation. For instance, the decoder 330 includes between 5 and 60 channels (or another range such as between 10 to 25 channels). In certain implementations, the decoder 330 includes eleven, twenty-one, or fifty-one channels. In many instances, the number of channels in the decoder 330 corresponds to the number of alpha-range classifications, as described below. In some implementations, the number of channels in the decoder 330 is larger than the number of alpha-range classifications (e.g., classes).

As noted above, regression-based decoders, such as those employed in many conventional systems, include a one-channel output indicating an alpha value of a given pixel. In these cases, the regression-based systems determine a single alpha value for the given pixel (e.g., an alpha value between 0-255, 0-1.00 if normalized, or using a different alpha value scale to indicate pixel transparency). In contrast, the decoder 330 in the alpha matting system 106 discretizes the alpha values into multiple alpha value sub-ranges (e.g., classes, bins, categorizes, sub-ranges, or subsets). To illustrate, if alpha values are quantized into 8 sub-ranges from a single alpha value range of 0-255, the eight alpha value sub-ranges may be 0-31, 32-63, 64-95, 96-127, 128-159, 160-191, 192-223, and 224-255. As another illustration, if alpha values are quantized into 11 sub-ranges from a single alpha value range of 0-1.00, the eleven alpha value sub-ranges may be 0.0-0.10, 0.11-0.18, 0.19-0.27, 0.28-0.36, 0.37-0.45, 0.46-0.55, 0.56-0.63, 0.64-0.73, 0.74-0.82, 0.83-0.91, and 0.92-1.00.

While the above paragraph provides an example of quantizing alpha values linearly, in some implementations, the alpha matting system 106 quantizes alpha values in non-linear space. For example, the alpha matting system 106 can utilize a log space to quantize alpha values when determining alpha-range classifications. In one or more implementations, the alpha matting system 106 unevenly spits the alpha-range sub-values. For instance, in these implementations, the alpha matting system 106 utilizes a normal distribution (or another distribution) to quantize alpha values into sub-ranges and/or alpha-range classifications.

Additionally, in one or more implementations, the alpha matting system 106 utilizes a rounding operation when quantizing alpha values. For example, the alpha matting system 106 rounds up or down to the nearest integer (or specified decimal place). Commonly, when a number is equally between two integers, a rounding operation rounds up. In alternative implementations, the alpha matting system 106 utilizes a floor operation (e.g., round down to the nearest integer) or a ceiling operation (e.g., round up to the nearest integer).

Figure 5:
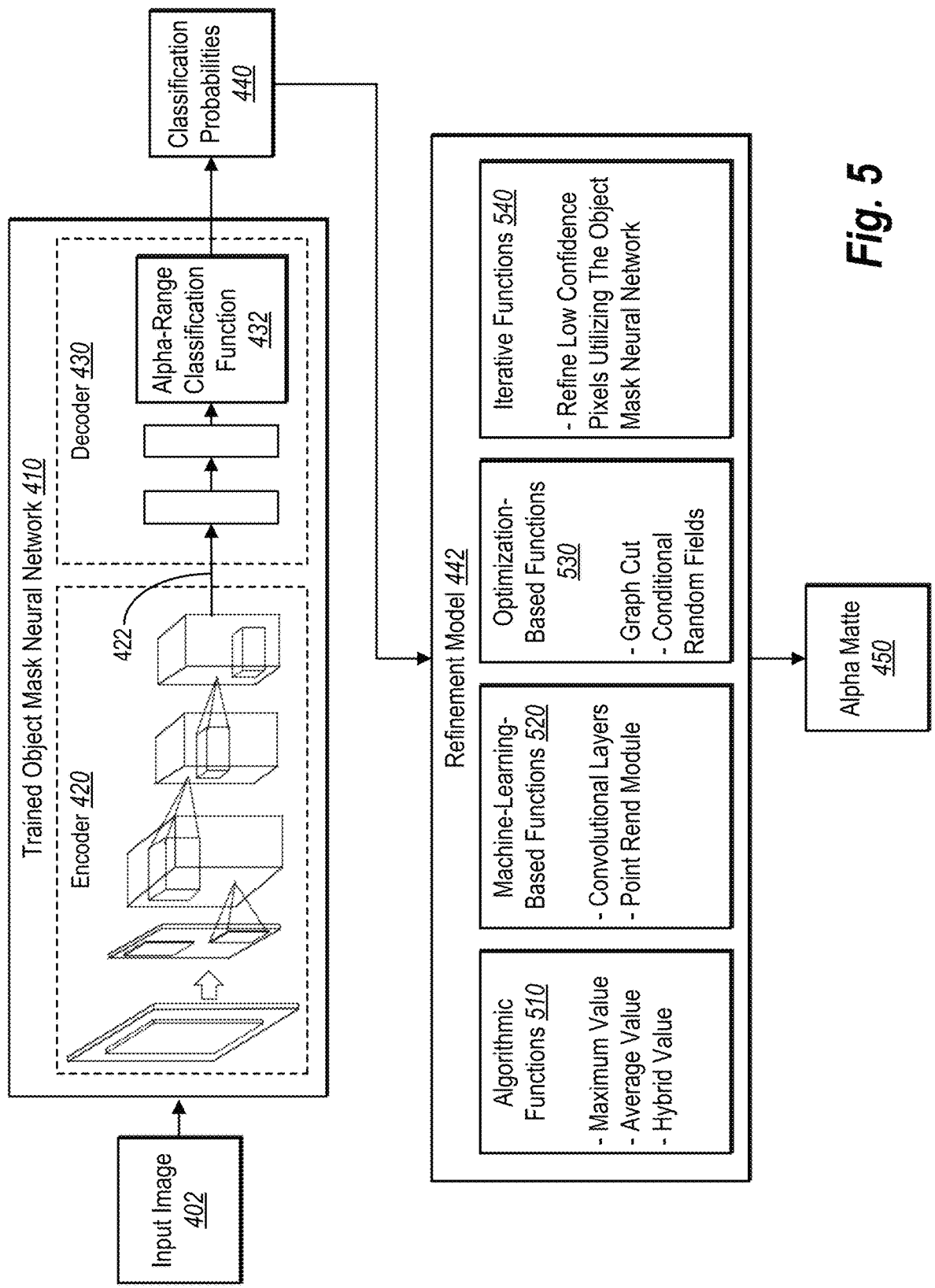
FIG. 5 illustrates a block diagram of determining alpha values for pixels of digital images utilizing the object mask neural network and one or more refinement models in accordance with one or more implementations.

Further, when a pixel is represented by one of 256 alpha values, human perception often cannot determine the difference between adjacent alpha values. Indeed, most human eyes are not sensitive to minute changes in alpha values. Accordingly, while increasing the number of alpha-range classifications may improve accuracy, positive returns can begin to diminish around fifty alpha-range classifications. For example, utilizing 256 different alpha-range classifications (e.g., an alpha value range of 1) may yield similar results as 51 alpha-range classifications in terms of human perception, but at a lower computing cost. To illustrate how error amounts reduce as the number of alpha value quantization increases, Table 2, which is provided below in connection with the text of FIG. 5, shows examples of varying the number of alpha-range classifications with respect to quantization error.

In various implementations, each alpha value sub-range corresponds to an alpha-range classification. Accordingly, in these implementations, because the decoder 330 includes multiple classifications, the alpha matting system 106 determines the probability that a given pixel matches an alpha-range classification (e.g., a SoftMax classification), which indicates the probability that the given pixel has an alpha value within the alpha value sub-range for the alpha-range classification. Accordingly, FIG. 3 shows the classification probabilities 340 (per pixel) being output from the object mask neural network 310 by the alpha matting system 106.

Figure 4A:
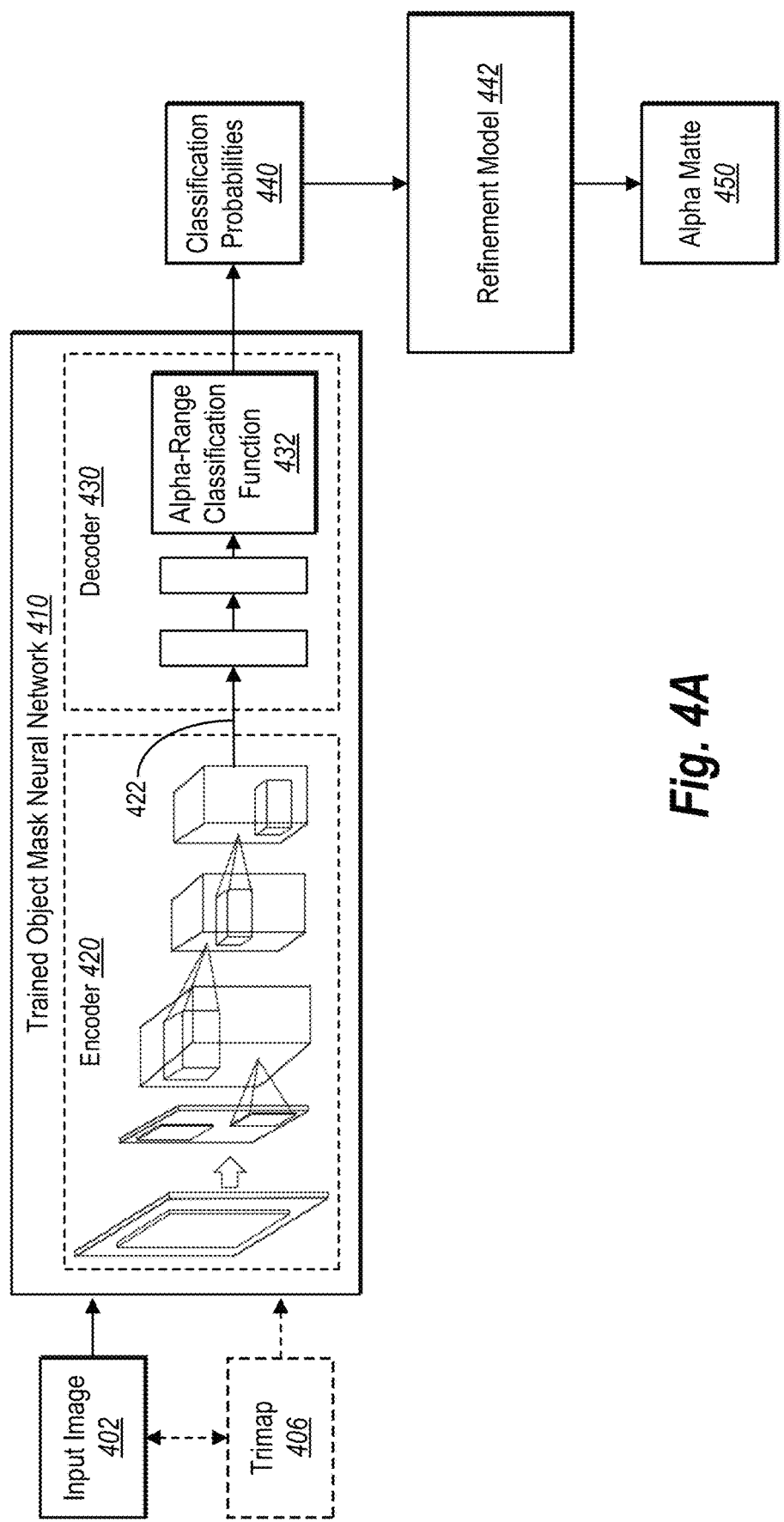
FIGS. 4A-4C illustrate block diagrams of utilizing the object mask neural network to determine alpha mattes for digital images in accordance with one or more implementations.
Figure 4B:
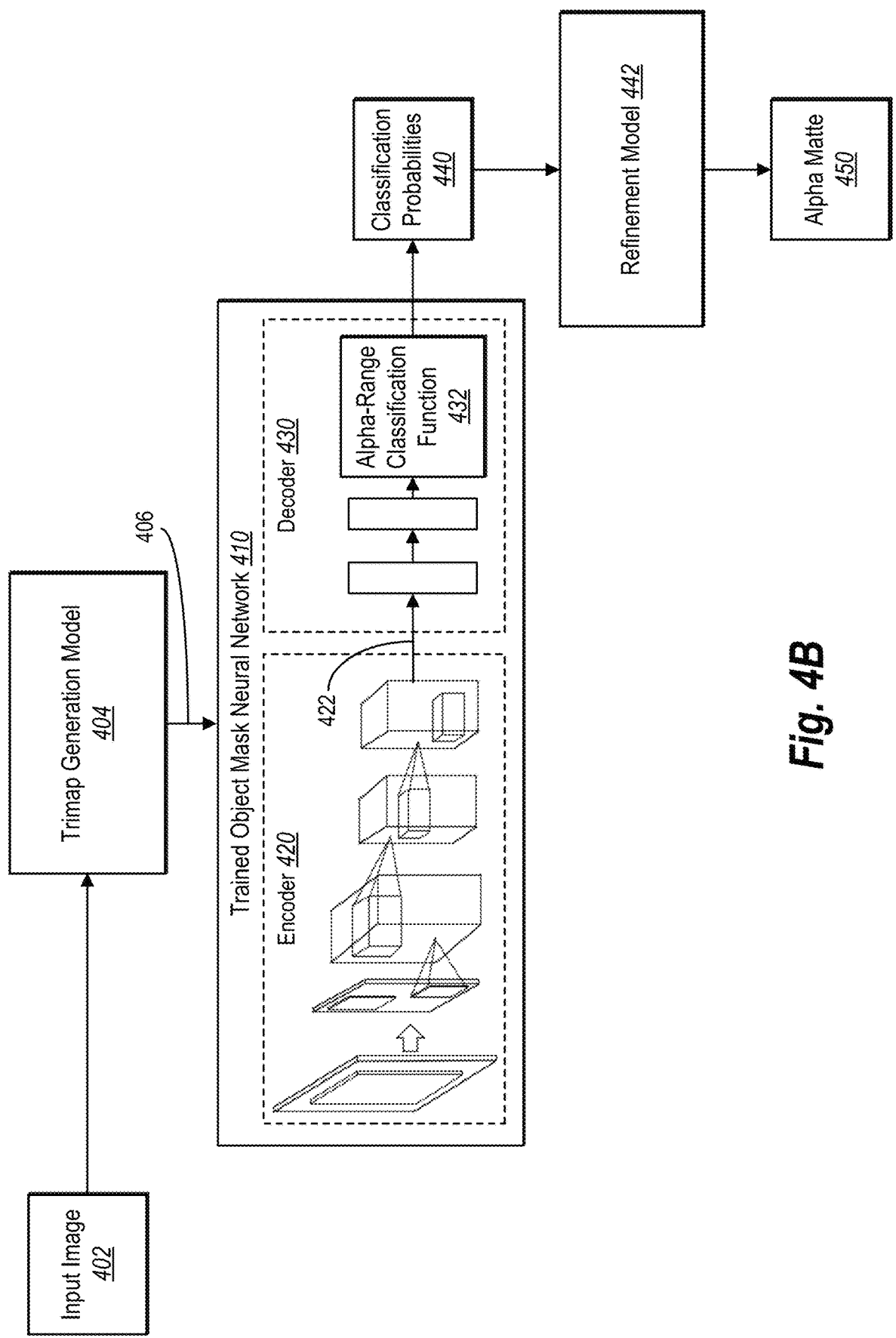
Figure 4C:
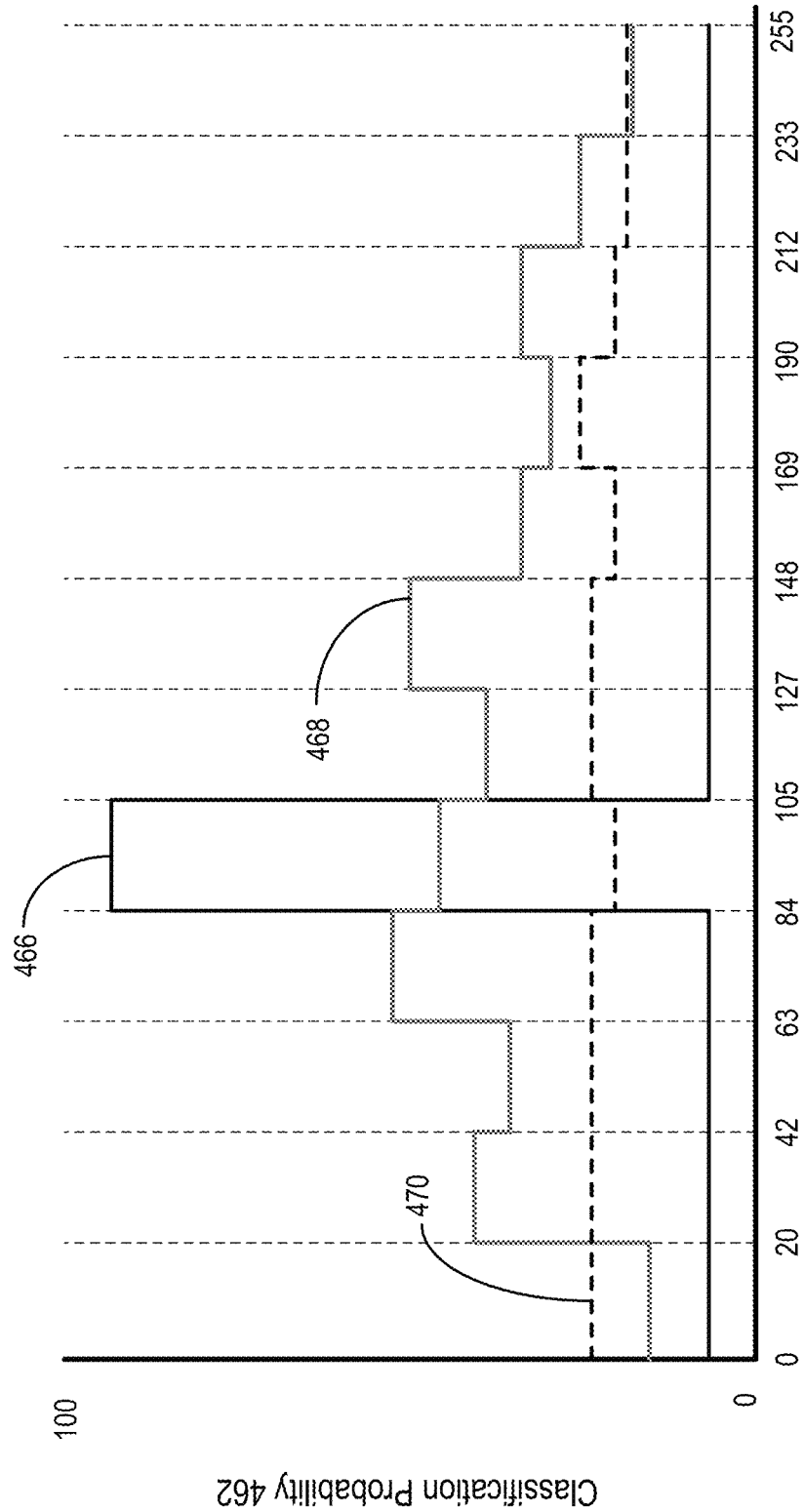

In some implementations, upon determining the classification probabilities 340 for each of the alpha-range classifications for a pixel, the alpha matting system 106 may combine and/or represent the classification probabilities 340 for the pixel within a confidence map or graph (e.g., a probability distribution), which plots classification probabilities of the pixel against the alpha-range classifications. FIG. 4C, which is described below, provides a visual example of an alpha-range confidence map for various pixels in a digital image.

As shown in FIG. 3, the alpha matting system 106 can generate an alpha matte 350 from the classification probabilities 340. For example, the alpha matting system 106 combines the classification probabilities for a pixel to determine the alpha value for the pixel. Then, the alpha matting system 106 maps the alpha values of the pixels to their corresponding location to generate the alpha matte 350. In alternative implementations, the alpha matting system 106 utilizes a refinement model to generate the alpha matte 350, as further described below in connection with FIGS. 4A-5.

As also mentioned above, FIG. 3 includes the loss model 360. In various implementations, a loss model 360 (or loss function) includes a function that indicates error amounts (e.g., measures of loss). For instance, in several embodiments, the alpha matting system 106 repetitively trains the object mask neural network 310 to reduce (e.g., minimize) overall loss. For example, the alpha matting system 106 utilizes the loss model 360 to train the object mask neural network 310 in a supervised manner by comparing ground truths from the training data 302 to the classification probabilities 340 and/or alpha mattes 350 generated from corresponding training data 302 by the object mask neural network 310. Indeed, in various implementations, the alpha matting system 106 trains and tunes the object mask neural network to learn parameters utilizing the loss model 360.

In some embodiments, the alpha matting system 106 utilizes multiple loss functions to minimize overall loss and learn parameters of the object mask neural network 310. To illustrate, the loss model 360 includes cross-entropy loss 362 (e.g., a classification loss) and focal loss 364. In particular, the focal loss 364 includes focal loss for unknown regions 366 and focal loss for a whole image 368. As described above, the loss model 360 may utilize additional and/or different loss types.

In one or more implementations, the alpha matting system 106 determines the cross-entropy loss 362 by comparing the alpha matte 350 generated by the object mask neural network 310 from a training image 304 with a corresponding ground-truth alpha matte 306. For example, the ground-truth alpha matte 306 provides accurate alpha values for pixels in the corresponding training image 304. Accordingly, the alpha matting system 106 utilizes a cross-entropy loss function to determine the cross-entropy loss 362 between an alpha matte 350 predicted by the object mask neural network 310 and a corresponding ground-truth alpha matte 306.

In some implementations, to account for the imbalanced distribution of alpha values, the alpha matting system 106 utilizes the focal loss 364. In many implementations, a focal loss function addresses classification imbalances that occur throughout training by utilizing a modulating factor to reduce the weight (e.g., influence) of correctly classified areas in an alpha matte (e.g., pixels that are clearly in the foreground or the background). As noted above, regression-based conventional systems cannot use focal loss without being incorrectly biased to learn incorrect network parameters because the confidence levels of alpha value determinations are unknown. However, the alpha matting system 106, which utilizes a classification-based neural network, is able to utilize the classification probabilities 340 and a focal loss function to accurately train the object mask neural network 310 based on the focal loss 364.

In various implementations, the alpha matting system 106 utilizes a focal loss function to determine the focal loss 364 based on the formulation shown in Equation 1 below.

$$\mathcal{L}_{Focal} = -(1-p)^2 \log(p) \quad (1)$$

In Equation 1, $(1-p)^2$ corresponds to the modulating factor and p represents the predicted probability value corresponding to a ground-truth alpha-range classification after a SoftMax classification (e.g., the classification probabilities 340). For example, in one or more implementations, the alpha matting system 106 determines the focal loss 364 by utilizing the focal loss function that compares classification probabilities determined for pixels corresponding to a training image 304 with the alpha values of the same pixels from the ground-truth alpha mattes 306.

As mentioned above, the alpha matting system 106 may utilize different types of focal loss 364. As shown, the focal loss 364 includes focal loss for unknown regions 366 and focal loss for a whole image 368. To illustrate, in some implementations, the alpha matting system 106 determines the focal loss for unknown regions 366 of an image. For example, as described below, the alpha matting system 106 may determine classification probabilities for an image (e.g., a training image 304) based on a trimap of the image having an unknown region of pixels (e.g., pixels not yet assigned to the foreground or the background). In this manner, the alpha matting system 106 utilizes the focal loss function to evaluate pixels in the unknown region against corresponding ground truth alpha values from corresponding ground-truth alpha mattes 306.

In some implementations, the alpha matting system 106 also determines the focal loss for a whole image 368. For example, the alpha matting system 106 utilizes the focal loss function provided above to evaluates pixels in the unknown region as well as the foreground regions and background regions against corresponding ground truth alpha values from the corresponding ground-truth alpha mattes 306.

In one or more implementations, the alpha matting system 106 combines (e.g., sums) the focal loss for unknown regions 366 and the focal loss for a whole image 368 at a predefined ratio to determine the focal loss 364. By utilizing the two focal loss functions, the alpha matting system 106 is able to further improve training the object mask neural network 310 above that of conventional image matting systems.

As mentioned above, in various implementations, the alpha matting system 106 trains the object mask neural network 310 based on the classification probabilities for pixels of digital images. As a result, the alpha matting system 106 is able to obtain confidence scores (e.g., a confidence map) without additional actions or processing. Additionally, the alpha matting system 106 is able to enforce loss functions on whole images instead of only the unknown regions, which further improves the results.

Moreover, in some implementations, utilizing classification probabilities for multiple alpha-range classifications enables the alpha matting system 106 to flexibly relax the burden and difficulty of predicting precise alpha values such that the alpha matting system 106 can focus on more challenging pixel areas in training. In particular, by generating a probability distribution over the possible answers for alpha values for a pixel (e.g., determining classification probabilities for the pixel), the alpha matting system 106 is able to identify areas of possible confusion and can target those areas for refinement. Further, in various implementations, the alpha matting system 106 utilizes the classification probabilities for the alpha-range classifications to determine to otherwise handle those confident areas using one or more post-processing functions (e.g., refinement models), which are described below in connection with FIG. 5.

Returning to FIG. 3, as shown, the alpha matting system 106 backpropagates error 370 to train the object mask neural network 310. For example, the alpha matting system 106 tunes weights and parameters of the object mask neural network 310 (i.e., the encoder 420 and the decoder 430) based on the cross-entropy loss 362 and/or the focal loss 364 to reduce overall loss and improve the ability of the object mask neural network to accurately generate classification probabilities 340 and alpha mattes 350 for digital images (e.g., training image 304).

Upon building and training the object mask neural network, the alpha matting system 106 is able to generate alpha mattes for digital images. To illustrate, FIGS. 4A-4C show utilizing the object mask neural network to determine alpha mattes for digital images in accordance with one or more implementations. In particular, FIG. 4A includes an input image 402, a trained object mask neural network 410, classification probabilities 440, a refinement model 442, and an alpha matte 450. Further, the trained object mask neural network 410 includes an encoder 420 and a decoder 430 having an alpha-range classifier function 432. In addition, FIG. 4A also includes a trimap 406 as an optional input.

As shown, the alpha matting system 106 provides the input image 402 to the trained object mask neural network 410. In some implementations, the alpha matting system 106 also provides the trimap 406 of the digital image as an input. In a similar manner as described above, in one or more implementations, the trained object mask neural network 410 encodes the input image 402 and/or trimap 406 to generate a feature map 422, then decodes the feature map 422 with the decoder 430 (having the alpha-range classifier function 432) to generate classification probabilities 440 for pixels of the input image 402.

As also shown, the alpha matting system 106 utilizes a refinement model 442 to generate an alpha matte 450 of the digital image. For example, the refinement model 442 refines the classification probabilities 440 to determine alpha values for pixels of the input image 402 as well as the alpha matte 450 for the input image 402. As described below in connection with FIG. 5, the refinement model 442 may include algorithmic functions, machine-learning-based functions, and/or optimization functions. Additionally, in connection with a refinement model 442, in some implementations, the alpha matting system 106 utilizes the trained object mask neural network 410 to further refine the classification probabilities for pixels as part of determining alpha values and the alpha matte 450.

Figure 6:
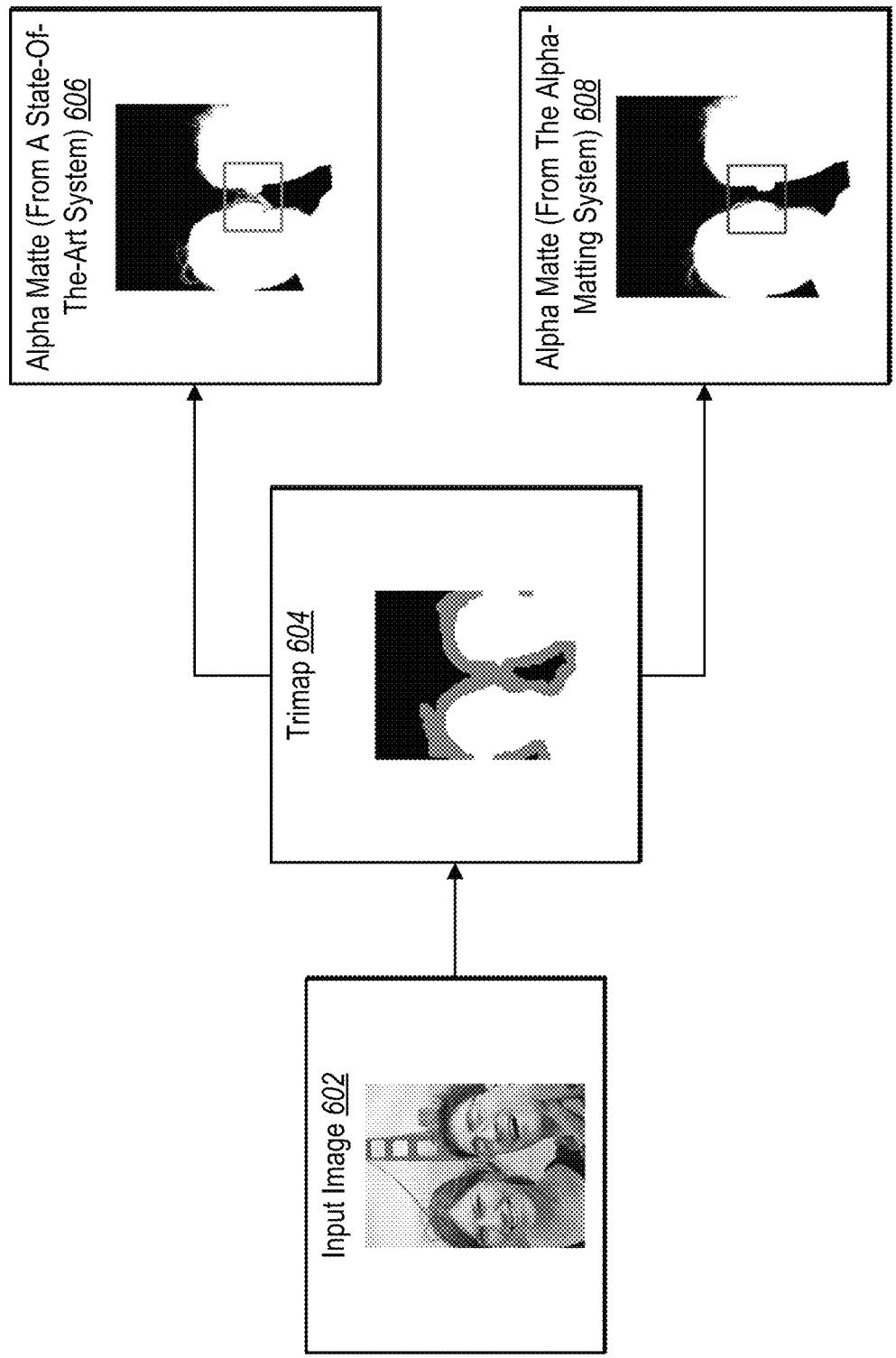
FIG. 6 illustrates qualitative results of an example implementation of the alpha matting system in accordance with one or more implementations compared to a state-of-the-art system.

As mentioned above, in various implementations, the alpha matting system 106 utilizes a trimap (e.g., combined with the digital image) as part of generating an alpha matte for a digital image. Accordingly, FIG. 4B provides additional detail regarding generating and/or receiving a trimap. To illustrate, FIG. 4B, adds a trimap generation model 404 to the components included in FIG. 4A. In one or more implementations, the alpha matting system 106 utilizes the trimap generation model 404 to generate a trimap 406 of the input image 402. As provided above, a trimap may include a foreground region having pixels assigned to foreground objects as well as a background region that includes pixels assigned to the background. In addition, a trimap includes an unknown region having pixels not yet assigned to either a foreground object or the background. In some implementations, the unknown region can also include pixels that are a combination or blending between a foreground object or the background. A visual example of a trimap is shown in FIG. 6, which is described below.

In some implementations, the trimap generation model 404 is an object detection neural network or utilized in connection with an object detection neural network. For instance, the alpha matting system 106 utilizes an object detection neural network to detect and/or classify one or more objects in the input image 402 as well as indicate the approximate location of the one or more objects in the input image 402. For example, the object detection neural network generates a bounding box approximately around a detected object. In various implementations, the alpha matting system 106 then generates a trimap of the detected object, as described above. In alternative implementations, the alpha matting system 106 provides the input image 402 with an indication of the detected object or a portion of the image that includes the detected object to the trained object mask neural network 410, which generates an alpha matte 450 for the detected object, as described above.

In one or more implementations, the alpha matting system 106 receives a trimap from a client device (e.g., based on user interaction with the client device). For example, the alpha matting system 106 enables a user to indicate the white, black, and/or gray regions of a trimap. To illustrate, in some implementations, the alpha matting system 106 utilizes a binary segmentation tool that detects the foreground and the background, then provides a user selection tool for marking the unknown region (e.g., the gray region). For instance, the user selection tool can include a brush that paints in or otherwise marks the unknown region. In another instance, the user selection tool is a slider that, when moved, expands or contracts the segmentation boundary of the unknown region.

In implementations where the alpha matting system 106 generates or otherwise obtains a trimap 406 of the input image 402, the alpha matting system 106 encodes the trimap 406 in addition to (or in place of) the input image 402, as described above. For example, the alpha matting system 106 generates a feature map of the trimap 406 based on encoding pixels in the foreground region, the background region, and/or the unknown regions.

As mentioned above, FIG. 4C provides a visual example of a confidence map 460 for multiple pixels. To illustrate, FIG. 4C shows a confidence map 460 (e.g., a probability map) that plots the classification probabilities 462 against alpha-range classifications 464. In particular, the confidence map 460 shows the classification probabilities 462 for a first pixel 466, a second pixel 468, and a third pixel 470 from a digital image with respect to the alpha-range classifications 464.

As shown, the classification probabilities 462 range from 0 to 100. For instance, the classification probabilities 462 correspond to the probability that a pixel matches each of the alpha-range classifications 464. In some implementations, the classification probabilities 462 for a pixel across the alpha-range classifications 464 sums to 100 (or one on a scale from 0.0-1.00). Note, for ease of explanation, the pixels 466-470 are merely illustrative and their classification probabilities 462 may not add up to 100 as drawn.

As also shown, the alpha-range classifications 464 range from 0-255, which corresponds to alpha values. In some implementations, the alpha-range classifications 464 ranges for 0-1 or another scale corresponding to alpha values, as described above. The confidence map 460 also shows multiple alpha-range classifications. For instance, the alpha-range classifications 464 include twelve alpha-range classifications as indicated by the dashed lines. For example, as shown, each alpha-range classification includes the sub-range of alpha values between a pair of adjacent dashed lines (e.g., spaced approximately every 21 alpha values).

To further illustrate, the first pixel 466 has a high classification probability for the alpha-range classification corresponding to the alpha values of 84-105 and lower classification probabilities elsewhere. Accordingly, in some implementations, the alpha matting system 106 determines that the first pixel 466 belongs to the alpha-range classification corresponding to the alpha values of 84-105. Accordingly, in these implementations, the alpha matting system 106 determines with very high confidence that the first pixel 466 has an alpha value between 84-105.

Additionally, the second pixel 468 has a higher classification probability for the alpha-range classification corresponding to the alpha values of 63-84 than for other alpha-range classifications. While the alpha matting system 106 may determine that the second pixel 468 has an alpha value between 63-84 (depending on how the alpha matting system 106 determines the alpha value), the alpha matting system 106 is less confident in this determination due to the classification probabilities of other alpha-range classifications (e.g., the alpha-range classification corresponding to the alpha values of 127-148 has a similar classification probability).

Further, as shown in the confidence map 460, the third pixel 470 has a slightly higher classification probability for the alpha-range classification corresponding to the alpha values of 169-190 but not much above the classification probabilities for the other alpha-range classifications. Accordingly, the alpha matting system 106 classifies the third pixel 470 to the alpha-range classification corresponding to the alpha value of 169-190, but with low confidence.

The alpha matting system 106 may utilize one or more operations to determine the alpha value for a pixel upon determining the alpha-range classification to which the pixel belongs. For example, in one or more implementations, the alpha matting system 106 selects the average or middle value from the alpha value sub-range to which the alpha-range classification corresponds. To illustrate, based on determining that the first pixel 466 is best classified to the alpha-range classification corresponding to the alpha values of 84-105, the alpha matting system 106 determines an alpha value of 95 for the first pixel 466 (e.g., the average of 84 and 105). In some implementations, the alpha matting system 106 selects the highest or lowest alpha value corresponding to a selected alpha-range classification (e.g., the alpha matting system 106 selects an alpha value of 84 or 105 for the first pixel 466).

As mentioned above, determining alpha values from classification probabilities for alpha-range classifications provides various advantages over conventional systems that utilize regression-based alpha value predictions. For example, utilizing pixel classification probabilities for multiple alpha-range classifications enables the alpha matting system 106 to relax the need to predict precise alpha values as alpha-range classifications cover a range of alpha values.

As also mentioned above, utilizing pixel classification probabilities for multiple alpha-range classifications allows the alpha matting system 106 to focus on more challenging regions and target those areas for refinement. To illustrate, because the alpha matting system 106 determines the first pixel with high confidence, the alpha matting system 106 is able to shift training focus away from similar pixel cases (e.g., partially based on the focal loss).

In contrast, even if the alpha matting system 106 correctly predicts the third pixel 470, because the alpha matting system 106 observes low confidence, the alpha matting system 106 focuses on training the object mask neural network to determine classification probabilities for pixels in similar cases at a higher confidence rate. Additionally, in some implementations, the alpha matting system 106 focuses on training the object mask neural network to better classify pixels similar to the second pixel 468 such that the classification probabilities are consolidated around one alpha-range classification rather than peaking at many alpha-range classifications.

Turning now to FIG. 5, additional detail is provided regarding various refinement models. In particular, FIG. 5 illustrates a block diagram of determining alpha values for pixels of digital images utilizing the object mask neural network and one or more refinement models in accordance with one or more implementations. As shown, FIG. 5 includes the input image 402, the trained object mask neural network 410, the classification probabilities 440, the refinement model 442, and the alpha matte 450, each of which is introduced previously.

In one or more implementations, the refinement models 442 utilizes one or more models or functions to determine alpha values from the classification probabilities 440. In some implementations, the refinement models 442 utilizes one or more functions to further refine the classification probabilities 440. As shown in FIG. 5, the refinement model 442 includes various refinement models and/or functions including algorithmic functions 510, machine-learning-based functions 520, optimization-based functions 530, and iterative functions 540.

In a number of implementations, the algorithmic functions 510 generates alpha values from the classification probabilities 440. For example, for each set of classification probabilities 440 determined for a pixel of the input image 402, the alpha matting system 106 may utilize one of the algorithmic functions 510 to generate an alpha value for the pixel. As shown, the algorithmic functions 510 includes determining a maximum value, an average value, or a hybrid value for a pixel.

To illustrate, regarding the maximum value function, the alpha matting system 106 determines the alpha value for a pixel based on which of the alpha-range classifications has the highest classification probability. For instance, the alpha matting system 106 compares the classification probabilities for each of the alpha-range classifications and selects the alpha-range classification having the highest confidence (as indicated by the classification probabilities). For example, for the first pixel shown in FIG. 4C (e.g., the first pixel 466), the alpha matting system 106 determines that the alpha value for the pixel is between 84-105 based on the alpha-range classification corresponding to the alpha values of 84-105 having the highest classification probability. Similarly, for the third pixel shown in FIG. 4C (e.g., the third pixel 470), the alpha matting system 106 determines that the alpha value for the pixel is between 169-190.

As described above, in various implementations, the alpha matting system 106 utilizes the average or middle alpha value of an alpha value sub-range corresponding to an alpha-range classification. For example, when a pixel is classified within an alpha-range classification corresponding to the alpha values of 90-100, the alpha matting system 106 selects an alpha value of 95 for the pixel. In alternative implementations, the alpha matting system 106 utilizes another alpha value in the sub-range, such as the lowest, highest, or a random alpha value.

Regarding the average value function of the algorithmic functions 510, in a number of implementations, the alpha matting system 106 determines a weighted average of the alpha-range classifications given their respective classification probabilities. For instance, in various implementations, the alpha matting system 106 weights each alpha-range classification by its classification probability. For example, considering the second pixel in the confidence map 460 in FIG. 4C (e.g., the second pixel 468), while a maximum value approach may yield an alpha value of 74 (e.g., the middle of the alpha-range classification having the highest classification probability), the average value approach would yield an alpha value around 108.

To further illustrate, suppose a pixel has a first classification probability of 20% for an alpha-range classification corresponding to an alpha value of 50 (e.g., 50 is the middle alpha value of the alpha-range classification), a second classification probability of 50% for an alpha-range classification corresponding to an alpha value of 100, and a third classification probability of 30% for an alpha-range classification corresponding to an alpha value of 150 (e.g., 50 at 20%, 100 at 50%, and 150 at 30%). In this illustration, if the alpha matting system 106 weights the first alpha value of 50 by 0.2, the second alpha value of 100 by 0.5, and the third alpha value of 150 by 0.3, the alpha matting system 106 can determine a weighted average alpha value of 105 for the pixel (e.g., 50×0.2/1+100×0.5/1+150×0.3/1=105).

In some implementations, such as the above illustration, the alpha matting system 106 utilizes a linear weighted average proportional to the classification probabilities for a pixel. In one or more implementations, the alpha matting system 106 utilizes a non-linear weighted average. For example, if the alpha-range classifications correspond to uneven alpha value sub-ranges, the alpha matting system 106 gives more weight to alpha-range classifications having larger alpha value sub-ranges (or vice versa).

Regarding the hybrid value function of the algorithmic functions 510, in various implementations, the alpha matting system 106 determines an alpha-range for a pixel based on a combination of the algorithmic functions 510 described above. For example, in one or more implementations, based on the maximum value function, the alpha matting system 106 utilizes a minimum alpha value threshold to filter out alpha-range classifications with lower classification probabilities. Then, utilizing the average value function, the alpha matting system 106 determines a weighted average alpha value from the remaining alpha-range classifications.

In one or more implementations, the minimum alpha value threshold is a predetermined classification probability (e.g., 10%, 20%, 25%, 30%, 40%, or 50%). In some implementations, the minimum alpha value threshold is relative to the highest classification probability of the pixel (e.g., any alpha-range classification having a classification probability within 30 alpha values of the highest classification probability). In certain implementations, the minimum alpha value threshold is based on the average value of the classification probabilities. In various implementations, the minimum alpha value threshold is based on a number of highest classification probabilities (e.g., the top 3, 5, 20%, or 50% of classification probabilities).

To illustrate, consider again the above illustration of the three classification probabilities for the three alpha-range classifications (e.g., the first at an alpha value of 50 at a classification probability of 20%, the second at an alpha value of 100 at a classification probability of 50%, and the third at an alpha value of 150 at a classification probability of 30%). If the alpha matting system 106 sets a minimum threshold alpha value at 0.3 or 30%, the alpha matting system 106 filters out the first alpha-range classification having a classification probability of 20%. From the remaining alpha-range classifications, the alpha matting system 106 utilizes the average value function to determine an alpha value of 119 for the pixel (e.g., 100 at 50% combined with 150 at 30%=100×0.5/0.8+150×0.3/0.8=118.75, rounded up to 119).

As mentioned above, the refinement model 442 includes machine-learning-based functions 520. For example, the alpha matting system 106 utilizes one or more learning-based functions to generate alpha values for pixels of the input image 402. In one or more implementations, the alpha matting system 106 adds additional neural network layers to the object mask neural network that include one or more of the machine-learning-based functions 520. In some implementations, the alpha matting system 106 utilizes a separate machine-learning model.

As shown, the machine-learning-based functions 520 includes utilizing convolutional layers and/or a point rend model. For example, in some implementations, the alpha matting system 106 adds four convolutional layers (or another number of layers) to the end of the object mask neural network (e.g., after or part of the decoder). For instance, the alpha matting system 106 includes these additional convolutional layers while training the object mask neural network and trains these convolutional layers to learn to transfer the classification probabilities 440 (e.g., a confidence map) into the alpha matte 450. In this manner, the alpha matting system 106 adds one or more machine-learning-based functions 520 that determines an improved alpha value from the classification probabilities of pixels for the alpha-range classifications.

In one or more implementations, the alpha matting system 106 also adds a point rend model to the additional convolutional layers. In some implementations, the alpha matting system 106 utilizes the additional convolutional layers and point rend model to determine alpha values based on the classification probabilities of pixels and, in turn, the alpha matte 450 from the alpha values. For instance, in either of the above implementations, the alpha matting system 106 utilizes the machine-learning-based functions 520 to determine (through training) the best alpha value from a set of classification probabilities for a pixel based on how closely the alpha matte generated with refined alpha values matches a corresponding ground-truth alpha matte (e.g., via loss functions and backpropagation). In some implementations, the alpha matting system 106 utilizes a point rend model as described in PointRend: Image Segmentation as Rendering by A. Kirillov et al., found at arXiv:1912.08193, 2020, the entirety of which is incorporated by reference. The alpha matting system 106 can utilizes a variety of models and point rend models.

In some implementations, the alpha matting system 106 utilizes one or more of the machine-learning-based functions 520 (e.g., the convolutional layers or the convolutional layers plus the point rend model) to determine alpha values for all of the pixel classification probabilities determined by the object mask neural network. In alternative implementations, the alpha matting system 106 utilizes one or more of the machine-learning-based functions 520 to determine alpha values for a subset of the pixel classification probabilities, such as pixels with classification probabilities below a confidence threshold. In these implementations, the alpha matting system 106 focuses on less confident areas of an input image 402 by further processing these areas to determine alpha values with higher confidences.

To illustrate, Table 1 below shows evaluation results of applying various refinement models 442 compared to a baseline model. In Table 1, "Regression Baseline Model" refers to a baseline model (described below), "Hybrid Value" refers to the hybrid value from the algorithmic functions 510 (based on a minimum threshold value of 0.3), "Convolutional Layers" refers to adding convolutional layers from the machine-learning-based functions 520, and "Convolutional Layers+Point Rend" refers to adding convolutional layers along with a point rend from the machine-learning-based functions 520. In addition, in Table 1, "SAD" refers to the sum of absolute differences, "MSE" refers to mean square error, "Gradient" refers to error gradient, and "Connectivity" refers to connectivity error.

TABLE 1

| Method | Error Evaluation Method | | | |
| --- | --- | --- | --- | --- |
| | SAD↓ | MSE↓ | Gradient↓ | Connectivity↓ |
| Regression Baseline Model | 34.42 | 0.0080 | 16.48 | 32.09 |
| Hybrid Value | 33.84 | 0.0076 | 15.66 | 31.13 |
| Convolutional Layers | 33.12 | 0.0077 | 15.50 | 30.45 |
| Convolutional Layers + Point Rend | 32.86 | 0.0074 | 15.41 | 29.64 |

As shown in Table 1, both the hybrid value of the algorithmic functions 510 and both of the machine-learning-based functions 520 outperform the regression baseline model. Indeed, Table 1 shows that applying the machine-learning-based functions 520 further improves the accuracy of generating an alpha matte.

As additional context for Table 1, the "Regression Baseline Model" refers to a ResNet34 regression neural network (e.g., a residual CNN) that utilizes a regression module to generate an alpha matte. Further, the results in Table 1 are evaluated against a common training data set (e.g., the Composition-1K Benchmark Dataset introduced in Xu et al., Deep Image Matting, found at arXiv: 1703.03872, 2017). In Table 1, lower error rates indicate better performance.

As mentioned above, the refinement model 442 includes optimization-based functions 530. For example, the alpha matting system 106 utilizes one or more optimization-based functions 530 to generate alpha values for pixels of the input image 402 from the pixel classification probabilities of the alpha-range classifications. As shown, optimization-based functions 530 can include graph cut (e.g., multi-label graph cut) and conditional random fields (CRF). In various implementations, these optimization-based functions 530 utilize neighboring information (e.g., alpha values of adjacent or nearby pixels) to determine the alpha value for a pixel. In some implementations, the optimization-based functions 530 smooth out alpha values near each other in the input image 402.

In some implementations, the refinement model 442 includes one or more functions based on the foreground and background estimations. For example, in some implementations, the alpha matting system 106 utilizes a refinement function that is sample-based or neural network-based to determine which improved alpha values is best based on how well the refinement function can reconstruct a training image given the foreground and background estimations.

As mentioned above, the refinement model 442 includes iterative functions 540. For example, the alpha matting system 106 utilizes one or more iterative functions 540 to refine the pixel classification probabilities of the alpha-range classifications. In additional or alternative implementations, the alpha matting system 106 utilizes one or more iterative functions 540 to refine alpha values and generate the alpha matte 450 (e.g., resulting in a refined alpha matte).

As shown, the iterative function 540 includes refining low confidence pixels utilizing the object mask neural network. To elaborate, as described previously, in various implementations, the alpha matting system 106 determines classification probabilities 440 for pixels of the input image 402 based on a trimap (e.g., an initial trimap). For example, the alpha matting system 106 generates a trimap of the input image 402 that roughly segments pixels of the image into foreground, background, and unknown regions. Further, the alpha matting system 106 determines the classification probabilities for the input image 402 across the alpha-range classifications by encoding the trimap (and the digital image) into a feature map and decoding the feature map utilizing the alpha-range classifier function, as described above.

Additionally, the alpha matting system 106 may generate a refined trimap from the pixel classification probabilities. To illustrate, the alpha matting system 106 identifies pixels from the unknown region of the initial trimap that are now classified as belonging to the foreground or background. Further, the alpha matting system 106 determines if the classification probabilities of identified foreground or background pixels satisfy a confidence threshold (e.g., 25%, 30%, 50%, 65%, 75%, or another value). For instance, the alpha matting system 106 determines if classification probability for the alpha-range classification in which the alpha value resides satisfies the confidence threshold. If so, the alpha matting system 106 adds the pixel into the refined trimap as belonging to the foreground or background regions, respectively. Otherwise, if the alpha-range classification for the pixel does not satisfy the confidence threshold, the alpha matting system 106 keeps the pixel in the unknown region in the refined trimap. In this manner, the alpha matting system 106 locks in the high-confidence foreground and background pixels into the refined trimap while keeping fewer confidence pixels in the unknown region. Moreover, the unknown region in the trimap becomes smaller while the foreground and background regions become larger.

In addition, in one or more implementations, the alpha matting system 106 provides the refined trimap to the object mask neural network to determine updated classification probabilities for the reduced set of pixels on the unknown region. In this manner, the object mask neural network utilizes the additional information from the newly classified foreground and background pixels to better classify pixels in the unknown region of the refined trimap.

In some implementations, the alpha matting system 106 generates the alpha matte 450 from the classification probabilities and updates (i.e., refined) classification probabilities for the alpha-range classifications. For example, the alpha matting system 106 utilizes one or more of the functions from the refinement model 442 described above. In alternative implementations, the alpha matting system 106 repeats the above process for multiple iterations.

In some implementations, the alpha matting system 106 modifies the alpha-range classifications before refining pixels. For example, the alpha matting system 106 increases (e.g., by 1.5, 2, or 3 times) the number of alpha-range classifications. In this manner, as the alpha matting system 106 narrows in on pixels in the unknown region of a trimap (e.g., by generating a refined trimap), the alpha matting system 106 can determine more precise alpha values for these pixels while not expending additional computing resources on confidently classified pixels.

To illustrate the concept of further quantizing alpha-range classifications into additional classes, Table 2 below shows how error rates decrease as the number of alpha-range classifications increases. Similar to Table 1, Table 2 is based on the same training data set (e.g., the Composition-1K Benchmark Dataset) and error evaluations (e.g., SAD, MSE, Gradient, and Connectivity) described above. In addition, in Table 2, "Spacing" refers to how often an alpha-range classification appears based on an alpha value range of 0-1.0, and "QN" refers to a quantization number (i.e., number of alpha-range classifications). For example, a spacing of 0.2 indicates alpha-range classifications from 0.0-0.2, 0.2-0.4, 0.4-0.6, 0.6-0.8, and 0.8-1.0, which results in 6 alpha-range classifications.

TABLE 2

| Spacing (QN) | Error Evaluation Method | | | |
| --- | --- | --- | --- | --- |
| | SAD↓ | MSE↓ | Gradient↓ | Connectivity↓ |
| 0.2 (6) | 19.22 | 1.14 | 3.44 | 5.11 |
| 0.1 (11) | 10.11 | 0.31 | 0.69 | 0.98 |
| 0.05 (21) | 5.27 | 0.082 | 0.14 | 1.65 |
| 0.033 (31) | 3.58 | 0.038 | 0.063 | 0.33 |
| 0.025 (41) | 2.71 | 0.022 | 0.034 | 0.80 |
| 0.02 (51) | 2.13 | 0.0136 | 0.020 | 0.20 |

As shown in Table 2, adding alpha-range classifications decreases error rates. Accordingly, the alpha matting system 106 may trade-off between utilizing additional alpha-range classifications for improved accuracy and fewer alpha-range classifications to preserve computing resources. However, as provided above, because humans are unable to perceive differences between slight alpha value changes, further quantizing the alpha-range classifications (e.g., beyond 51 classes) may result in diminishing returns while consuming additional computing resources.

In one or more implementations, the alpha matting system 106 performs a step for determining a plurality of alpha-range probability distributions for a plurality of pixels for the digital image. The above description of FIGS. 3, 4A-4C, and 5, particularly the description of the acts involved in utilizing the alpha-range classifier function, provide supporting acts and algorithms for performing a step for determining a plurality of alpha-range probability distributions for a plurality of pixels for the digital image.

Turning now to FIG. 6, as described above, additional detail is provided regarding qualitative results of the implementations of the alpha matting system compared to conventional systems. In particular, FIG. 6 illustrates qualitative results of an example implementation of the alpha matting system in accordance with one or more implementations compared to a state-of-the-art system. As shown, FIG. 6 includes an input image 602 (i.e., a digital image), a trimap 604, an alpha matte from a state-of-the-art system 606, and an alpha matte from the alpha matting system 608 (e.g., from an example implementation of the alpha matting system 106).

As shown, the trimap includes black, white, and gray regions. As illustrated, the black region represents the background, the white region represents foreground objects, and the gray region represents unknown pixels. Additional detail regarding trimaps is provided above.

As described above, in various implementations, the alpha matting system 106 generates an alpha matte from the input image 602 and/or trimap 604 utilizing an object mask neural network having an alpha-range classifier function. As shown, in an example implementation, the alpha matting system 106 generates the alpha matte from the alpha matting system 608 (or simply "alpha matte 608"). In addition, FIG. 6 includes the alpha matte from a state-of-the-art system 606. For context, the state-of-the-art system is published in F, B, Alpha Matting, by M. Forte and F. Pitié, found at arXiv:2003.07711, 2020.

As shown, the alpha matte 608 from the example implementation of the alpha matting system 106 is less blurry than the alpha matte from the state-of-the-art system 606. In addition, when focusing on the pixels within the boxes, the alpha matte from a state-of-the-art system 606 incorrectly includes portions of the bridge from the input image 602 as part of the foreground. In contrast, the alpha matte 608 from the example implementation of the alpha matting system 106 omits these pixels by correctly assigning them to the background.

Additionally, researchers evaluated example implementations of the alpha matting system 106 to a baseline model. To illustrate, Table 3 shows the results of the evaluation. Similar to Table 1, Table 3 includes the same regression baseline model (e.g., a ResNet34 regression neural network), the same training data set (the Composition-1K Benchmark Dataset), and the same error evaluations (e.g., SAD, MSE, Gradient, and Connectivity) described above. In addition, in Table 3, "Alpha Matting System" refers to an example implementation of the alpha matting system 106 and "QN" refers to a quantization number (i.e., number of alpha-range classifications).

TABLE 3

| Method | Error Evaluation Method | | | |
| --- | --- | --- | --- | --- |
| | SED↓ | MSE↓ | Gradient↓ | Connectivity↓ |
| Regression Baseline Model | 34.42 | 0.0080 | 16.48 | 32.09 |
| Alpha Matting System (ON = 11) | 35.00 | 0.0080 | 16.88 | 28.28 |
| Alpha Matting System (ON = 21) | 33.87 | 0.0078 | 15.98 | 30.91 |
| Alpha Matting System (ON = 51) | 33.18 | 0.0077 | 16.38 | 30.68 |

As shown in Table 3, the example implementations of the alpha matting system 106 outperform the regression baseline model. Further, as the number (e.g., QNs) of alpha-range classifications increases, the error rates generally decrease.

Figure 7:
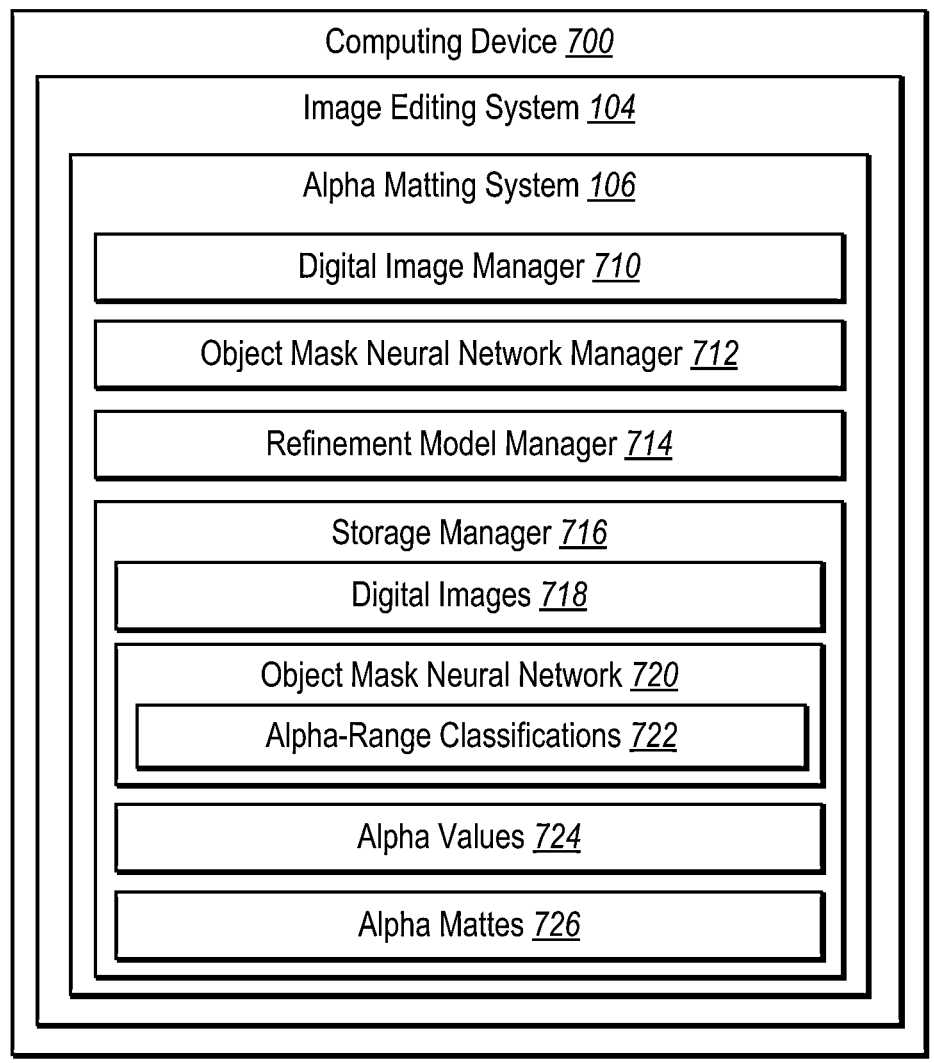
FIG. 7 illustrates a schematic diagram of the alpha matting system in accordance with one or more implementations.

Referring now to FIG. 7, additional detail is provided regarding the capabilities and components of an alpha matting system 106 in accordance with one or more implementations. In particular, FIG. 7 shows a schematic diagram of an example architecture of the alpha matting system 106 implemented within an image editing system 104 and hosted on a computing device 700.

In addition, the computing device 700 may represent various types of computing devices (e.g., the client device 102 and/or the server device 108). For example, in one or more implementations, the computing device 700 is a mobile computing device, such as a laptop, a tablet, a mobile telephone, a smartphone, a wearable device, or a device connected to the internet. In some implementations, the computing device 700 is a non-mobile computing device, such as a server, a cluster of servers, a desktop, or another type of non-mobile computing device. Additional details with regard to the computing device 700 are discussed below with respect to FIG. 9.

As shown, the computing device 700 includes the image editing system 104, which is described above, and the alpha matting system 106. The alpha matting system 106 includes various components for performing the processes and features described herein. To illustrate, the alpha matting system 106 includes a digital image manager 710, an object mask neural network manager 712, a refinement model manager 714, and a storage manager 716. As shown, the storage manager 716 includes digital images 718, an object mask neural network 720 having alpha-range classifications 722, alpha values 724, and alpha mattes 726.

As mentioned above, the alpha matting system 106 includes the digital image manager 710. In general, the digital image manager 710 facilitates identifying, accessing, receiving, obtaining, generating, importing, exporting, copying, modifying, removing, providing, and/or organizing digital images 718. In some implementations, the digital image manager 710 communicates with the storage manager 716 to store and retrieve the digital images 718, for example, within a digital image database or stored in a memory device. Examples of digital images include input digital images, training images, and in some instances, trimaps.

As shown, the alpha matting system 106 includes the object mask neural network manager 712. In various implementations, the object mask neural network manager 712 maintains, creates, generates, trains, updates, accesses, and/or utilizes various machine-learning models including one or more neural networks, such as the object mask neural network 720 having a decoder with an alpha-range classifier function, as described above. For example, the object mask neural network manager 712 trains and tunes the object mask neural network 720 to generate classification probabilities for alpha-range classifications 722, as described above. In some implementations, as described above, the object mask neural network 720 includes a multi-channel decoder having at least as many channels as the number of alpha-range classifications 722. Further, in some implementations, the 712 generates alpha mattes 726 from alpha values 724 determined from pixel classification probabilities with respect to the alpha-range classifications 722 for digital images.

As shown, the alpha matting system 106 includes the refinement model manager 714. In various implementations, the refinement model manager 714 facilitates identifying, accessing, receiving, obtaining, generating, executing removing, providing, and/or otherwise managing refinement models. For example, the refinement model manager 714 utilizes one or more refinement functions or models, such as an algorithmic function, a machine-learning-based function, an optimization function, or an integration function to generate alpha values 724 and/or alpha mattes 726, as described above.

Each of the components of the alpha matting system 106 shown in FIG. 7 may include software, hardware, or both. For example, the components may include one or more instructions stored on a computer-readable storage medium and executable by processors of one or more computing devices, such as a client device (e.g., a mobile client device) or server device. When executed by the processors, the computer-executable instructions of the alpha matting system 106 may cause a computing device to perform the feature learning methods described herein. Alternatively, the components may include hardware, such as a special-purpose processing device to perform a certain function or group of functions. In addition, the components of the alpha matting system 106 may include a combination of computer-executable instructions and hardware.

Furthermore, the components of the alpha matting system 106 included in FIG. 7 may be implemented as one or more operating systems, as one or more stand-alone applications, as one or more modules of an application, as one or more plug-ins, as one or more library functions or functions that may be called by other applications, and/or as a cloud-computing model. Thus, the components may be implemented as a stand-alone application, such as a desktop or mobile application. Additionally, the components may be implemented as one or more web-based applications hosted on a remote server. The components may also be implemented in a suite of mobile device applications or "apps." To illustrate, the components may be implemented in an application, including but not limited to ADOBE CREATIVE CLOUD, ADOBE PHOTOSHOP, ADOBE ILLUSTRATOR, ADOBE AFTER EFFECTS, or other digital content applications or software packages. The foregoing are either registered trademarks or trademarks of Adobe Inc. in the United States and/or other countries.

The preceding figures, the corresponding text, and the examples provide several different methods, systems, devices, and non-transitory computer-readable media of the alpha matting system 106. In addition to the foregoing, one or more implementations may also be described in terms of flowcharts comprising acts for accomplishing a particular result, such as the flowcharts of acts shown in FIG. 8. Additionally, the acts described herein may be repeated or performed in parallel with one another or parallel with different instances of the same or similar acts.

Figure 8:
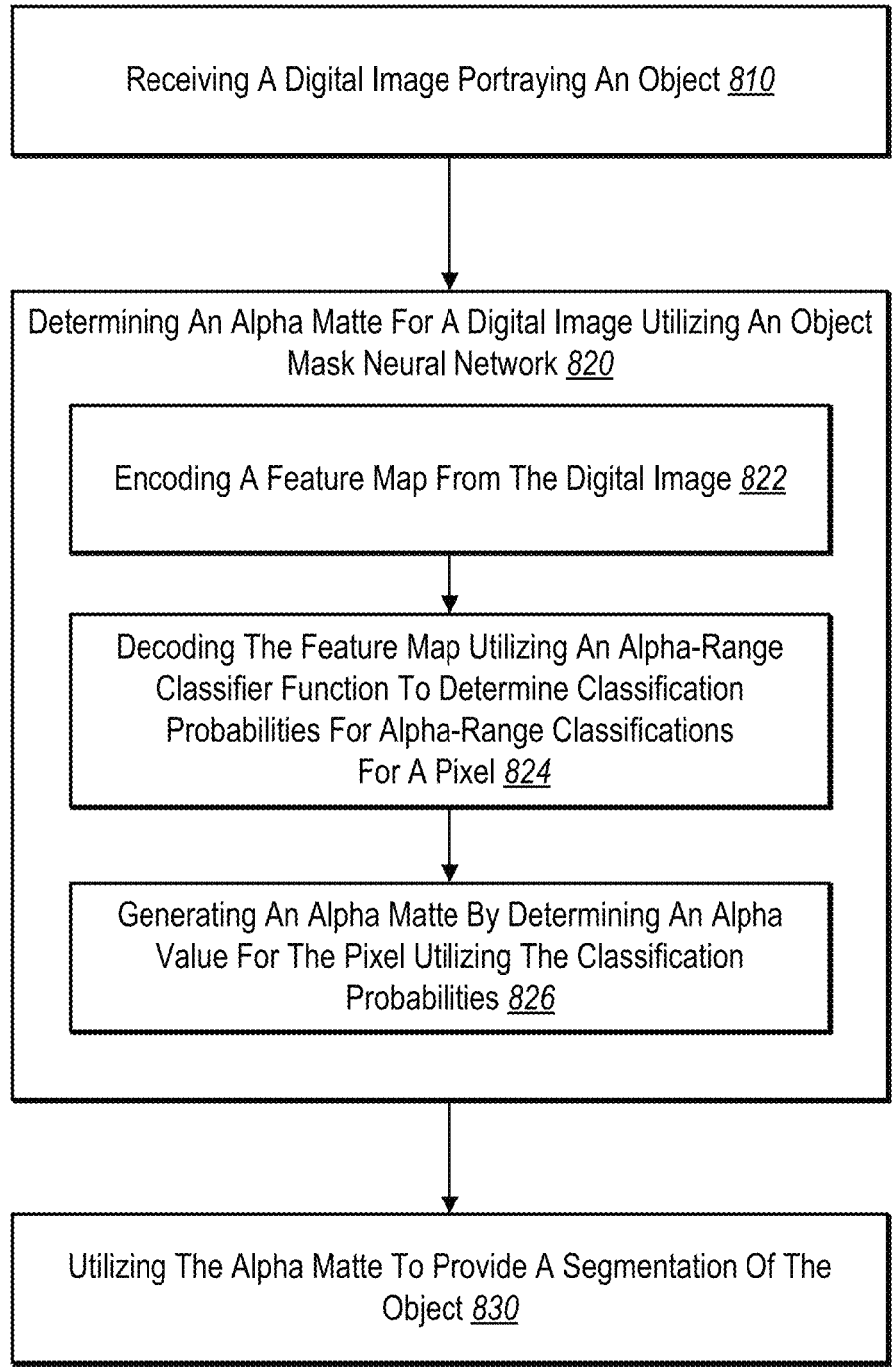
FIG. 8 illustrates a flowchart of a series of acts for determining an alpha matte for a digital image utilizing an object mask neural network in accordance with one or more implementations.

While FIG. 8 illustrates acts according to one or more implementations, alternative implementations may omit, add to, reorder, and/or modify any of the acts shown in FIG. 8. The acts of FIG. 8 may be performed as part of methods. Alternatively, non-transitory computer-readable mediums may comprise instructions that, when executed by one or more processors, cause a computing device to perform the acts of FIG. 8. In some implementations, one or more systems may perform the acts of FIG. 8.

As mentioned previously, FIG. 8 illustrates a flowchart of a series of acts 800 for determining an alpha matte for a digital image utilizing an object mask neural network in accordance with one or more implementations. In one or more implementations, the series of acts 800 is implemented on one or more computing devices, such as the client device 102, server device 108, or the computing device 700. In addition, in some implementations, the series of acts are implemented in a digital medium environment for editing digital images. For example, the series of acts are implemented on a computing device having memory that includes an object mask neural network having an encoder and a decoder where the decoder includes an alpha-range classifier function.

As shown, the series of acts 800 includes an act 810 of receiving a digital image portraying an object. For example, in various implementations, a client device provides a digital image. In some implementations, the act 810 includes receiving a digital image along with a selection or indication of the object to be selected. In one or more implementations, the act 810 includes receiving a digital image from an object detection neural network.

As also shown, the series of acts 800 includes an act 820 of determining an alpha matte for a digital image utilizing an object mask neural network. As shown, the act 820 includes a number of sub-acts. In various implementations, the sub-acts are performed within or in connection with an object mask neural network having an encoder and a decoder. In some implementations, the decoder includes an alpha-range classifier function, as described above.

As shown, the act 820 includes a sub-act 822 of encoding a feature map from the digital image. In particular, the sub-act 822 may involve generating a feature map from the digital image utilizing an encoder of the object mask neural network. In one or more implementations, the sub-act 822 includes generating a trimap of the digital image. In additional implementations, the sub-act 822 includes generating the feature map from the digital image by utilizing the encoder to generate the feature map from the trimap.

In addition, the act 820 includes a sub-act 824 of decoding the feature map utilizing an alpha-range classifier function to determine classification probabilities for alpha-range classifications for a pixel. In particular, the sub-act 824 may involve decoding the feature map utilizing an alpha-range classifier function of the object mask neural network to determine, for a pixel of the digital image, a plurality of classification probabilities for a plurality of alpha-range classifications. In one or more implementations, the sub-act 824 includes generating, for the pixel, a classification probability of the plurality of classification probabilities for each channel of the plurality of channels of the decoder. In certain implementations, the decoder of the object mask neural network includes a plurality of channels corresponding to the plurality of alpha-range classifications. In some implementations, the sub-act 824 includes determining, for the pixel, between five and sixty classification probabilities for a corresponding number of alpha-range classifications.

As shown, the act 820 includes a sub-act 826 of generating an alpha matte by determining an alpha value for the pixel utilizing the classification probabilities. In particular, the sub-act 826 may involve generating an alpha matte by determining an alpha value for the pixel utilizing the plurality of classification probabilities for the plurality of alpha-range classifications. In one or more implementations, the sub-act 826 includes utilizing a refinement model to determine an alpha value for the pixel from the plurality of classification probabilities of the pixel for the plurality of alpha-range classifications and generating the alpha matte for the digital image from the alpha value.

In various implementations, the sub-act 826 includes generating the alpha matte (that has the alpha value for the pixel) by averaging the plurality of classification probabilities for the plurality of alpha-range classifications. Similarly, in one or more implementations, the sub-act 826 includes generating the alpha matte (that has the alpha value for the pixel) by selecting, for each pixel of the plurality of pixels, a subset of classification probabilities from the plurality of classification probabilities that satisfy a classification threshold and determining, for each pixel of the plurality of pixels, a weighted combination for the subset of classification probabilities to determine an alpha value for the pixel.

In certain implementations, the sub-act 826 includes generating the alpha matte (that has the alpha value for the pixel) by determining a weighted combination of the alpha-range classifications based on the plurality of classification probabilities. In some implementations, the sub-act 826 includes generating the alpha matte (that has the alpha value for the pixel) by selecting a subset of classification probabilities from the plurality of classification probabilities that satisfy a classification threshold and combining the subset of classification probabilities to determine the alpha value for the pixel.

In some implementations, the sub-act 826 includes generating the alpha matte (that has the alpha value for the pixel) by generating a feature map from the digital image and an initial trimap of the digital image, generating a refined trimap based on the plurality of classification probabilities for the plurality of alpha-range classifications for the pixel, and utilizing the object mask neural network and the refined trimap to generate the alpha matte. In example implementations, the sub-act 826 includes generating the alpha matte, which includes the alpha values for a plurality of pixels, by utilizing an optimization model to determine the alpha values from the plurality of alpha-range probability distributions.

In particular implementations, the sub-act 826 includes generating the alpha matte (having the alpha value for the pixel) by utilizing convolutional neural network layers to determine the alpha value from the plurality of classification probabilities for the plurality of alpha-range classifications. In additional implementations, the sub-act 826 includes utilizing the convolutional neural network layers and a point rend model to determine the alpha value from the plurality of classification probabilities for the plurality of alpha-range classifications.

In one or more implementations, the sub-act 826 includes generating the alpha matte by determining, for an additional pixel from the digital image, additional classification probabilities for the plurality of alpha-range classifications utilizing the alpha-range classifier function; determining an additional alpha value for the additional pixel from the digital image utilizing the additional classification probabilities; and generating the alpha matte utilizing the alpha value for the pixel and the additional alpha value for the additional pixel.

As shown, the series of acts 800 also includes an act 830 of utilizing the alpha matte to provide a segmentation of the object. In particular, the act 830 may involve providing, for display via the client device, a segmentation of the object portrayed in the digital image utilizing the alpha matte. In some implementations, the act 830 includes detecting an object in the digital image utilizing an object detection neural network. In certain implementations, the act 830 includes detecting an object in the digital image utilizing an object detection neural network.

The series of acts 800 may include various additional acts. For example, the series of acts 800 may include acts of determining learned parameters of the object mask neural network by comparing the plurality of classification probabilities of the pixel for the plurality of alpha-range classifications to a ground-truth value for the pixel utilizing a first focal loss that evaluates unknown regions of the digital image; comparing the plurality of classification probabilities of the pixel for the plurality of alpha-range classifications to the ground-truth value for the pixel utilizing a second focal loss that evaluates foreground regions, background regions, and unknown regions of the digital image; and determining the learned parameters of the object mask neural network based on the first focal loss and the second focal loss.

The term "digital environment," as used herein, generally refers to an environment implemented, for example, as a stand-alone application (e.g., a personal computer or mobile application running on a computing device), as an element of an application, as a plug-in for an application, as a library function or functions, as a computing device, and/or as a cloud-computing system. A digital medium environment allows the alpha matting system to generate and utilize the object mask neural network, as described herein.

Implementations of the present disclosure may comprise or utilize a special-purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

The computer-readable media may be any available media that is accessible by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure may comprise at least two distinctly different kinds of computer-readable media: non-transitory computer-readable storage media (devices) and transmission media.

Non-transitory computer-readable storage media (devices) includes RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which may be used to store desired program code means in the form of computer-executable instructions or data structures and which is accessible by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media may include a network and/or data links that are used to carry desired program code means in the form of computer-executable instructions or data structures and that are accessed by a general-purpose or special-purpose computer. Combinations of the above should also be included within the scope of computer-readable media.

Further, upon reaching various computer system components, program code means in the form of computer-executable instructions or data structures may be transferred automatically from transmission media to non-transitory computer-readable storage media (devices) (or vice versa). For example, computer-executable instructions or data structures received over a network or data link may be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) may be included in computer system components that also (or even primarily) utilize transmission media.

Computer-executable instructions comprise, for example, instructions and data which, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure may also be implemented in cloud computing environments. As used herein, the term "cloud computing" refers to a model for enabling on-demand network access to a shared pool of configurable computing resources. For example, cloud computing may be employed in the marketplace to offer ubiquitous and convenient on-demand access to the shared pool of configurable computing resources. The shared pool of configurable computing resources may be rapidly provisioned via virtualization and released with low management effort or service provider interaction, and then scaled accordingly.

A cloud-computing model may be composed of various characteristics such as, for example, on-demand self-service, broad network access, resource pooling, rapid elasticity, measured service, and so forth. A cloud-computing model may also expose various service models, such as, for example, Software as a Service ("SaaS"), Platform as a Service ("PaaS"), and Infrastructure as a Service ("IaaS"). A cloud-computing model may also be deployed using different deployment models such as private cloud, community cloud, public cloud, hybrid cloud, and so forth. In addition, as used herein, the term "cloud-computing environment" refers to an environment in which cloud computing is employed.

Figure 9:
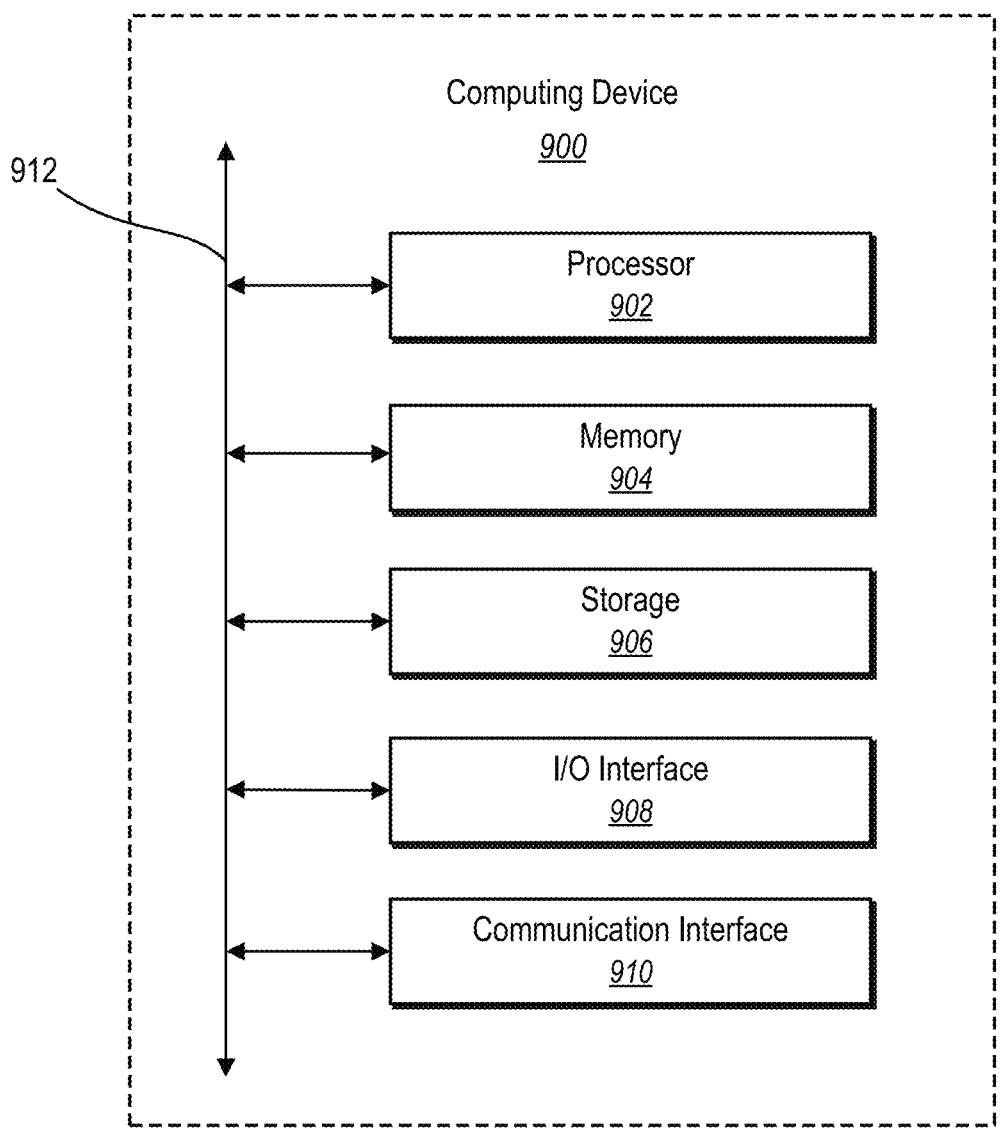
FIG. 9 illustrates a block diagram of an example computing device for implementing one or more implementations of the present disclosure.

FIG. 9 illustrates a block diagram of an example computing device 900 that may be configured to perform one or more of the processes described above. One will appreciate that one or more computing devices, such as client device 102, server device 108, or the computing device 700. In one or more implementations, the computing device 900 may be a non-mobile device (e.g., a desktop computer, a server device, a web server, a file server, a social networking system, a program server, an application store, or a content provider). Further, the computing device 900 may be a server device that includes cloud-based processing and storage capabilities. In some implementations, the computing device 900 may be a mobile device (e.g., a laptop, a tablet, a smartphone, a mobile telephone, a camera, a tracker, a watch, a wearable device, etc.).

As shown in FIG. 9, the computing device 900 may include one or more processor(s) 902, memory 904, a storage device 906, input/output interfaces 908 (or simply ("I/O interfaces 908"), and a communication interface 910, which may be communicatively coupled by way of a communication infrastructure (e.g., bus 912). While the computing device 900 is shown in FIG. 9, the components illustrated in FIG. 9 are not intended to be limiting. Additional or alternative components may be used in other implementations. Furthermore, in certain implementations, the computing device 900 includes fewer components than those shown in FIG. 9. Components of the computing device 900 shown in FIG. 9 will now be described in additional detail.

In particular implementations, the processor(s) 902 includes hardware for executing instructions, such as those making up a computer program. As an example, and not by way of limitation, to execute instructions, the processor(s) 902 may retrieve (or fetch) the instructions from an internal register, an internal cache, memory 904, or a storage device 906 and decode and execute them.

The computing device 900 includes memory 904, which is coupled to the processor(s) 902. The memory 904 may be used for storing data, metadata, and programs for execution by the processor(s). The memory 904 may include volatile and/or non-volatile memories, such as Random-Access Memory ("RAM"), Read-Only Memory ("ROM"), a solid-state disk ("SSD"), Flash, Phase Change Memory ("PCM"), or other types of data storage. The memory 904 may be internal or distributed memory.

The computing device 900 includes a storage device 906 includes storage for storing data or instructions. As an example, and not by way of limitation, the storage device 906 may include a non-transitory storage medium described above. The storage device 906 may include a hard disk drive (HDD), flash memory, a Universal Serial Bus (USB) drive, or a combination of these or other storage devices.

As shown, the computing device 900 includes one or more I/O interfaces 908, which are provided to allow a user to provide input to (e.g., user strokes), receive output from, and otherwise transfer data to and from the computing device 900. These I/O interfaces 908 may include a mouse, keypad, or a keyboard, a touch screen, camera, optical scanner, network interface, modem, other known I/O devices, or a combination of these I/O interfaces 908. The touch screen may be activated with a stylus or a finger.

The I/O interfaces 908 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interfaces 908 are configured to provide graphical data to a display for presentation to a user. The graphical data may be representative of one or more graphical user interfaces and/or any other graphical content as may serve a particular implementation.

The computing device 900 may further include a communication interface 910. The communication interface 910 may include hardware, software, or both. The communication interface 910 provides one or more interfaces for communication (such as, for example, packet-based communication) between the computing device and one or more other computing devices or one or more networks. As an example, and not by way of limitation, communication interface 910 may include a network interface controller (NIC) or network adapter for communicating with an Ethernet or other wire-based network or a wireless NIC (WNIC) or wireless adapter for communicating with a wireless network, such as a WI-FI. The computing device 900 may further include a bus 912. The bus 912 may include hardware, software, or both that connects components of computing device 900 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions that, when executed by at least one processor, cause a computing device to:
    determine an alpha matte for a digital image utilizing an object mask neural network comprising an encoder and a decoder, wherein the decoder comprises an alpha-range classifier function and a number of output channels, by:
    generating, utilizing the encoder, a feature map from the digital image;
    dividing an alpha-range of alpha values into a number of alpha-range classifications comprising sub-ranges of the alpha-range, wherein the number of alpha-range classifications correspond to the number of output channels;
    decoding the feature map utilizing the alpha-range classifier function to determine, for a pixel of the digital image, a plurality of alpha-range classification probabilities for the number of alpha-range classifications; and
    generating the alpha matte by utilizing a refinement model to determine an alpha value for the pixel from the plurality of alpha-range classification probabilities for the number of alpha-range classifications.

2. The non-transitory computer-readable medium of claim 1, further comprising instructions that, when executed by the at least one processor, cause the computing device to generate, for the pixel, an alpha-range classification probability of the plurality of alpha-range classification probabilities for each output channel of the number of output channels of the decoder.

3. The non-transitory computer-readable medium of claim 1, further comprising instructions that, when executed by the at least one processor, cause the computing device to generate the alpha matte comprising the alpha value for the pixel by determining a weighted combination of the number of alpha-range classifications based on the plurality of alpha-range classification probabilities.

4. The non-transitory computer-readable medium of claim 1, further comprising instructions that, when executed by the at least one processor, cause the computing device to generate the alpha matte comprising the alpha value for the pixel by:
    selecting a sub-range of classification probabilities from the plurality of alpha-range classification probabilities that satisfy a classification threshold; and
    combining the sub-range of classification probabilities to determine the alpha value for the pixel.

5. The non-transitory computer-readable medium of claim 1, further comprising instructions that, when executed by the at least one processor, cause the computing device to generate the alpha matte comprising the alpha value for the pixel by:
  generating the feature map from the digital image and an initial trimap of the digital image;
  generating a refined trimap based on the plurality of alpha-range classification probabilities for the number of alpha-range classifications for the pixel; and
  utilizing the object mask neural network and the refined trimap to generate the alpha matte.

6. The non-transitory computer-readable medium of claim 1, further comprising instructions that, when executed by the at least one processor, cause the computing device to generate the alpha matte comprising the alpha value for the pixel by utilizing convolutional neural network layers to determine the alpha value from the plurality of alpha-range classification probabilities for the number of alpha-range classifications.

7. The non-transitory computer-readable medium of claim 6, further comprising instructions that, when executed by the at least one processor, cause the computing device to generate the alpha matte utilizing the convolutional neural network layers and a point rend model to determine the alpha value from the plurality of alpha-range classification probabilities for the number of alpha-range classifications.

8. The non-transitory computer-readable medium of claim 1, further comprising instructions that, when executed by the at least one processor, cause the computing device to determine, for the pixel, between five and sixty classification probabilities for a corresponding number of alpha-range classifications.

9. The non-transitory computer-readable medium of claim 1, further comprising instructions that, when executed by the at least one processor, cause the computing device to generate the alpha matte by:
  determining, for an additional pixel from the digital image, additional alpha-range classification probabilities for the number of alpha-range classifications utilizing the alpha-range classifier function;
  determining an additional alpha value for the additional pixel from the digital image utilizing the additional alpha-range classification probabilities; and
  generating the alpha matte utilizing the alpha value for the pixel and the additional alpha value for the additional pixel.

10. The non-transitory computer-readable medium of claim 1, further comprising instructions that, when executed by the at least one processor, cause the computing device to:
  detect an object in the digital image utilizing an object detection neural network; and
  provide, for display on a client device, a segmentation of the object portrayed in the digital image utilizing the alpha matte.

11. A system comprising:
  one or more memory devices comprising an object mask neural network having an encoder and a decoder, the decoder comprising an alpha-range classifier function and a number of output channels;
  one or more processors that are configured to cause the system to determine an alpha matte for a digital image utilizing the object mask neural network by:
  generating, utilizing the encoder, a feature map from the digital image;
  dividing an alpha-range of alpha values into a number of alpha-range classifications comprising sub-ranges of the alpha-range, wherein the number of alpha-range classifications correspond to the number of output channels;
  determining, for a pixel of the digital image, a plurality of alpha-range classification probabilities for the number of alpha-range classifications utilizing the alpha-range classifier function of the decoder and the feature map;
  determining, utilizing a machine learning model, an alpha value for the pixel based on the plurality of alpha-range classification probabilities of the pixel for the number of alpha-range classifications; and
  generating the alpha matte for the digital image from the alpha value.

12. The system of claim 11, wherein the one or more processors are further configured to cause the system to generate a trimap of the digital image; and
  wherein generating the feature map from the digital image comprises utilizing the encoder to generate the feature map from the trimap.

13. The system of claim 11, wherein the machine learning model determines the alpha value for the pixel by averaging the plurality of alpha-range classification probabilities for the number of alpha-range classifications.

14. The system of claim 11 wherein the number of alpha-range classifications comprises a first alpha-range classification comprising a first set of alpha values and a second alpha-range classification comprising a second set of alpha values.

15. The system of claim 14, wherein determining the plurality of alpha-range classification probabilities for the number of alpha-range classifications comprises:
  determining a first alpha-range classification probability for the first alpha-range classification for the pixel; and
  determining a second alpha-range classification probability for the second alpha-range classification for the pixel.

16. The system of claim 11, wherein the one or more processors are further configured to cause the system to:
  receive, via a client device, a digital image portraying an object;
  detect an object in the digital image utilizing an object detection neural network; and
  provide, for display on a client device, a segmentation of the object portrayed in the digital image utilizing the alpha matte.

17. The system of claim 11, wherein the one or more processors are further configured to cause the system to determine learned parameters of the object mask neural network by:
  comparing the plurality of alpha-range classification probabilities of the pixel for the number of alpha-range classifications to a ground-truth value for the pixel utilizing a first focal loss that evaluates unknown regions of the digital image;
  comparing the plurality of alpha-range classification probabilities of the pixel for the number of alpha-range classifications to the ground-truth value for the pixel utilizing a second focal loss that evaluates foreground regions, background regions, and unknown regions of the digital image; and
  determining the learned parameters of the object mask neural network based on the first focal loss and the second focal loss.

18. A computer-implemented method comprising:
receiving, via a client device, a digital image portraying an object;

generating, utilizing a convolutional neural network comprising an encoder and a decoder, a feature map from the digital image, wherein the decoder comprises an alpha-range classifier function and a number of output channels;

determining, for a pixel of the digital image, a plurality of alpha-range classification probabilities for a number of alpha-range classifications comprising sub-ranges of an alpha-range utilizing the alpha-range classifier function and the feature map, wherein the number of alpha-range classifications correspond to the number of output channels;

generating, utilizing the convolutional neural network, an alpha matte comprising an alpha value for the pixel based on the number of alpha-range classifications; and providing, for display via the client device, a segmentation of the object portrayed in the digital image utilizing the alpha matte.

19. The computer-implemented method of claim 18, further comprising generating the alpha matte comprising the alpha value for the pixel by:

selecting, for the pixel, a subset of alpha-range classification probabilities from the number of alpha-range classifications that satisfy a classification threshold; and determining, for the pixel, a weighted combination for the subset of alpha-range classification probabilities to determine an alpha value for the pixel.

20. The computer-implemented method of claim 18, further comprising generating the alpha matte that comprises the alpha value for the pixel by utilizing an optimization model to determine the alpha value from the number of alpha-range classifications.

* * * * *